(12) United States Patent  
Zhang et al.

(10) Patent No.: US 11,659,192 B2  
(45) Date of Patent: May 23, 2023

(54) SUB-BLOCK MV INHERITANCE BETWEEN COLOR COMPONENTS

(71) Applicants: Beijing Bytedance Network Technology Co., Ltd., Beijing (CN); Bytedance Inc., Los Angeles, CA (US)

(72) Inventors: Kai Zhang, San Diego, CA (US); Li Zhang, San Diego, CA (US); Hongbin Liu, Beijing (CN); Yue Wang, Beijing (CN)

(73) Assignees: BEIJING BYTEDANCE NETWORK TECHNOLOGY CO., LTD, Beijing (CN); BYTEDANCE INC., Los Angeles, CA (US)

( * ) Notice: Subject to any disclaimer, the term of this patent is extended or adjusted under 35 U.S.C. 154(b) by 0 days.

(21) Appl. No.: 17/221,122

(22) Filed: Apr. 2, 2021

(65) Prior Publication Data  
US 2021/0227234 A1    Jul. 22, 2021

Related U.S. Application Data

(63) Continuation of application No. 17/071,412, filed on Oct. 15, 2020, now Pat. No. 11,197,007, which is a  
(Continued)

(30) Foreign Application Priority Data

Jun. 21, 2018  (WO) ................ PCT/CN2018/092118  
Nov. 10, 2018  (WO) ................ PCT/CN2018/114931

(51) Int. Cl.  
*H04N 19/52*  (2014.01)  
*H04N 19/176*  (2014.01)  
(Continued)

(52) U.S. Cl.  
CPC ......... *H04N 19/186* (2014.11); *H04N 19/119* (2014.11); *H04N 19/136* (2014.11);  
(Continued)

(58) Field of Classification Search  
CPC .. H04N 19/119; H04N 19/176; H04N 19/521; H04N 19/58  
See application file for complete search history.

(56) References Cited

U.S. PATENT DOCUMENTS 7,529,302 B2  5/2009  Mukerjee et al.  
8,184,715 B1  5/2012  Rosenzweig et al.  
(Continued)

FOREIGN PATENT DOCUMENTS

CA  3025490 A1  12/2017  
CA  3037685 A1  3/2018  
(Continued)

OTHER PUBLICATIONS

Final Office Action from U.S. Appl. No. 17/031,451 dated Dec. 21, 2021.  
(Continued)

*Primary Examiner* — Tsion B Owens  
(74) *Attorney, Agent, or Firm* — Perkins Cole LLP

(57) ABSTRACT

Devices, systems and methods for sub-block based prediction are described. In a representative aspect, a method for video processing includes partitioning a first component of a current video block into a first set of sub-blocks and partitioning a second component of the current video block into a second set of sub-blocks. A sub-block of the second component corresponds to one or more sub-blocks of the first component. The method also includes deriving, based on a color format of the current video block, motion vectors  
(Continued)

for a sub-block of the second component based on motion vectors for one or more corresponding sub-blocks of the first color component.

20 Claims, 18 Drawing Sheets

Related U.S. Application Data continuation of application No. PCT/IB2019/055247, filed on Jun. 21, 2019.

(51) Int. Cl.
*H04N 19/186* (2014.01)
*H04N 19/55* (2014.01)
*H04N 19/119* (2014.01)
*H04N 19/136* (2014.01)

(52) U.S. Cl.
CPC ......... *H04N 19/176* (2014.11); *H04N 19/52* (2014.11); *H04N 19/55* (2014.11)

(56) References Cited

U.S. PATENT DOCUMENTS

| | | |
|---|---|---|
| 8,462,846 B2 | 6/2013 | Zhang |
| 9,294,777 B2 | 3/2016 | Wang |
| 9,374,595 B2 | 6/2016 | Kim et al. |
| 9,432,684 B2 | 8/2016 | Lee et al. |
| 9,521,425 B2 | 12/2016 | Chen et al. |
| 9,615,089 B2 | 4/2017 | Fartukov et al. |
| 9,667,996 B2 | 5/2017 | Chen et al. |
| 9,674,542 B2 | 6/2017 | Chen et al. |
| 9,762,927 B2 | 9/2017 | Chen et al. |
| 9,900,593 B2 | 2/2018 | Xiu et al. |
| 9,948,930 B2 | 4/2018 | Panusopone et al. |
| 9,955,186 B2 | 4/2018 | Chon et al. |
| 10,045,014 B2 | 8/2018 | Zhang et al. |
| 10,142,655 B2 | 11/2018 | Lin et al. |
| 10,298,950 B2 | 5/2019 | Wang et al. |
| 10,362,330 B1 | 7/2019 | Li et al. |
| 10,404,990 B2 | 9/2019 | Hendry et al. |
| 10,419,763 B2 | 9/2019 | Huang et al. |
| 10,448,010 B2 | 10/2019 | Chen et al. |
| 10,484,686 B2 | 11/2019 | Xiu et al. |
| 10,523,964 B2 | 12/2019 | Chuang et al. |
| 10,560,712 B2 | 2/2020 | Zou et al. |
| 10,701,366 B2 | 6/2020 | Chen et al. |
| 10,708,592 B2 | 7/2020 | Dong et al. |
| 10,757,417 B2 | 8/2020 | Zhang et al. |
| 10,778,999 B2 | 9/2020 | Li et al. |
| 10,779,002 B2 | 9/2020 | Chen et al. |
| 10,785,494 B2 | 9/2020 | Chien et al. |
| 10,805,630 B2 | 10/2020 | Li et al. |
| 10,841,609 B1 | 11/2020 | Liu et al. |
| 10,904,565 B2 | 1/2021 | Chuang et al. |
| 11,172,196 B2 | 11/2021 | Zhang et al. |
| 11,197,003 B2 | 12/2021 | Zhang et al. |
| 11,197,007 B2 | 12/2021 | Zhang et al. |
| 11,202,065 B2 | 12/2021 | Zhang et al. |
| 11,202,081 B2 | 12/2021 | Zhang et al. |
| 11,477,463 B2 | 10/2022 | Zhang et al. |
| 11,509,915 B2 | 11/2022 | Zhang et al. |
| 2007/0192762 A1 | 8/2007 | Eichenberger et al. |
| 2011/0002386 A1 | 1/2011 | Zhang |
| 2011/0194609 A1 | 8/2011 | Rusert et al. |
| 2011/0200107 A1 | 8/2011 | Ryu |
| 2012/0219216 A1 | 8/2012 | Sato |
| 2012/0287999 A1 | 11/2012 | Li et al. |
| 2012/0320984 A1 | 12/2012 | Zhou et al. |
| 2013/0003842 A1 | 1/2013 | Kondo |
| 2013/0101041 A1 | 4/2013 | Fishwick et al. |
| 2013/0107958 A1 | 5/2013 | Shimada et al. |
| 2013/0128976 A1 | 5/2013 | Koyama et al. |
| 2013/0182755 A1 | 7/2013 | Chen et al. |
| 2013/0229485 A1 | 9/2013 | Rusanovskyy et al. |
| 2013/0272410 A1 | 10/2013 | Seregin et al. |
| 2013/0329007 A1 | 12/2013 | Zhang et al. |
| 2014/0086325 A1 | 3/2014 | Chen et al. |
| 2014/0286408 A1 | 9/2014 | Zhang et al. |
| 2014/0286416 A1 | 9/2014 | Jeon et al. |
| 2014/0294066 A1 | 10/2014 | Kondo |
| 2014/0294078 A1 | 10/2014 | Seregin et al. |
| 2014/0334551 A1 | 11/2014 | Kim et al. |
| 2015/0023423 A1 | 1/2015 | Zhang et al. |
| 2015/0181216 A1 | 6/2015 | Zhang et al. |
| 2015/0249828 A1 | 9/2015 | Rosewarne et al. |
| 2015/0312588 A1 | 10/2015 | Yamamoto et al. |
| 2015/0373350 A1 | 12/2015 | Hendry et al. |
| 2015/0373357 A1 | 12/2015 | Pang et al. |
| 2015/0373362 A1 | 12/2015 | Pang et al. |
| 2016/0057420 A1 | 2/2016 | Pang et al. |
| 2016/0073132 A1 | 3/2016 | Zhang et al. |
| 2016/0100189 A1 | 4/2016 | Pang et al. |
| 2016/0142729 A1 | 5/2016 | Wang et al. |
| 2016/0286229 A1 | 9/2016 | Li et al. |
| 2016/0366441 A1 | 12/2016 | An et al. |
| 2016/0373756 A1 | 12/2016 | Yu et al. |
| 2017/0054996 A1* | 2/2017 | Xu .................. H04N 19/593 |
| 2017/0085905 A1 | 3/2017 | Kadono et al. |
| 2017/0142418 A1 | 5/2017 | Li et al. |
| 2017/0223378 A1 | 8/2017 | Tao et al. |
| 2017/0238005 A1 | 8/2017 | Chien et al. |
| 2017/0238011 A1* | 8/2017 | Pettersson .............. H04N 19/54 375/240.12 |
| 2017/0272748 A1 | 9/2017 | Seregin et al. |
| 2017/0272782 A1 | 9/2017 | Li et al. |
| 2017/0289566 A1 | 10/2017 | He et al. |
| 2017/0310990 A1 | 10/2017 | Hsu |
| 2017/0332095 A1 | 11/2017 | Zou et al. |
| 2017/0332099 A1 | 11/2017 | Lee et al. |
| 2017/0339404 A1 | 11/2017 | Panusopone et al. |
| 2017/0339405 A1 | 11/2017 | Wang et al. |
| 2018/0041762 A1 | 2/2018 | Ikai et al. |
| 2018/0048889 A1 | 2/2018 | Zhang et al. |
| 2018/0054628 A1 | 2/2018 | Pettersson et al. |
| 2018/0063553 A1 | 3/2018 | Zhang et al. |
| 2018/0098062 A1 | 4/2018 | Li et al. |
| 2018/0098087 A1 | 4/2018 | Li et al. |
| 2018/0124394 A1 | 5/2018 | Xu et al. |
| 2018/0131952 A1 | 5/2018 | Xiu et al. |
| 2018/0184117 A1 | 6/2018 | Chen et al. |
| 2018/0192069 A1 | 7/2018 | Chen et al. |
| 2018/0192072 A1 | 7/2018 | Chen et al. |
| 2018/0199056 A1 | 7/2018 | Sato |
| 2018/0220149 A1 | 8/2018 | Son et al. |
| 2018/0247396 A1 | 8/2018 | Pouli et al. |
| 2018/0249172 A1 | 8/2018 | Chen et al. |
| 2018/0270500 A1 | 9/2018 | Li et al. |
| 2018/0278951 A1 | 9/2018 | Seregin et al. |
| 2018/0288425 A1 | 10/2018 | Panusopone et al. |
| 2018/0288441 A1 | 10/2018 | Zhang et al. |
| 2018/0324454 A1 | 11/2018 | Lin et al. |
| 2018/0332298 A1 | 11/2018 | Liu et al. |
| 2018/0376166 A1 | 12/2018 | Chuang et al. |
| 2019/0020895 A1 | 1/2019 | Liu et al. |
| 2019/0037231 A1 | 1/2019 | Ikai et al. |
| 2019/0052886 A1 | 2/2019 | Chiang et al. |
| 2019/0058897 A1 | 2/2019 | Han et al. |
| 2019/0068977 A1 | 2/2019 | Zhang et al. |
| 2019/0075293 A1 | 3/2019 | Lim et al. |
| 2019/0104303 A1 | 4/2019 | Xiu et al. |
| 2019/0124332 A1 | 4/2019 | Lim et al. |
| 2019/0158866 A1* | 5/2019 | Kim .................. H04N 19/56 |
| 2019/0182504 A1 | 6/2019 | Lainema |
| 2019/0191171 A1 | 6/2019 | Ikai et al. |
| 2019/0222859 A1 | 7/2019 | Chuang et al. |
| 2019/0246128 A1 | 8/2019 | Xu et al. |
| 2019/0246143 A1 | 8/2019 | Zhang et al. |
| 2019/0273943 A1 | 9/2019 | Zhao et al. |
| 2019/0306502 A1 | 10/2019 | Gadde et al. |
| 2019/0320181 A1 | 10/2019 | Chen et al. |
| 2019/0320189 A1 | 10/2019 | Cooper et al. |

(56) References Cited

U.S. PATENT DOCUMENTS

| | | |
|---|---|---|
| 2019/0335170 A1 | 10/2019 | Lee et al. |
| 2019/0342547 A1 | 11/2019 | Lee et al. |
| 2019/0364295 A1 | 11/2019 | Li et al. |
| 2019/0373261 A1 | 12/2019 | Eglimez et al. |
| 2019/0387250 A1 | 12/2019 | Boyce et al. |
| 2020/0021837 A1 | 1/2020 | Ikai et al. |
| 2020/0021839 A1 | 1/2020 | Pham Van et al. |
| 2020/0045310 A1 | 2/2020 | Chen et al. |
| 2020/0045311 A1 | 2/2020 | Yoo |
| 2020/0053364 A1 | 2/2020 | Seo |
| 2020/0084441 A1 | 3/2020 | Lee et al. |
| 2020/0084454 A1 | 3/2020 | Liu et al. |
| 2020/0099951 A1 | 3/2020 | Hung et al. |
| 2020/0112741 A1* | 4/2020 | Han ............... H04N 19/423 |
| 2020/0120334 A1 | 4/2020 | Xu et al. |
| 2020/0128237 A1 | 4/2020 | Xu et al. |
| 2020/0128258 A1 | 4/2020 | Chen et al. |
| 2020/0137398 A1 | 4/2020 | Zhao |
| 2020/0145688 A1 | 5/2020 | Zou et al. |
| 2020/0154127 A1 | 5/2020 | Lee |
| 2020/0169726 A1 | 5/2020 | Kim et al. |
| 2020/0179911 A1 | 6/2020 | Aono et al. |
| 2020/0213594 A1 | 7/2020 | Liu et al. |
| 2020/0213612 A1 | 7/2020 | Liu et al. |
| 2020/0213622 A1 | 7/2020 | Xu et al. |
| 2020/0221077 A1 | 7/2020 | Park et al. |
| 2020/0221110 A1 | 7/2020 | Chien et al. |
| 2020/0221120 A1 | 7/2020 | Robert et al. |
| 2020/0267408 A1 | 8/2020 | Lee et al. |
| 2020/0275120 A1 | 8/2020 | Lin et al. |
| 2020/0296380 A1 | 9/2020 | Aono et al. |
| 2020/0296382 A1 | 9/2020 | Zhao et al. |
| 2020/0296415 A1 | 9/2020 | Chen et al. |
| 2020/0336738 A1 | 10/2020 | Xiu et al. |
| 2020/0351505 A1 | 11/2020 | Seo |
| 2020/0359029 A1 | 11/2020 | Liu et al. |
| 2020/0374543 A1 | 11/2020 | Liu et al. |
| 2020/0374544 A1 | 11/2020 | Liu et al. |
| 2020/0382771 A1 | 12/2020 | Liu et al. |
| 2020/0382795 A1 | 12/2020 | Zhang et al. |
| 2020/0382807 A1 | 12/2020 | Liu et al. |
| 2020/0396453 A1 | 12/2020 | Zhang et al. |
| 2020/0396462 A1 | 12/2020 | Zhang et al. |
| 2020/0396465 A1 | 12/2020 | Zhang et al. |
| 2020/0404255 A1 | 12/2020 | Zhang et al. |
| 2020/0404260 A1 | 12/2020 | Zhang et al. |
| 2020/0413048 A1 | 12/2020 | Zhang et al. |
| 2021/0006780 A1 | 1/2021 | Zhang et al. |
| 2021/0006787 A1 | 1/2021 | Zhang et al. |
| 2021/0029356 A1 | 1/2021 | Zhang et al. |
| 2021/0029362 A1 | 1/2021 | Liu et al. |
| 2021/0029368 A1 | 1/2021 | Zhang et al. |
| 2021/0037240 A1 | 2/2021 | Zhang et al. |
| 2021/0037256 A1 | 2/2021 | Zhang et al. |
| 2021/0051339 A1 | 2/2021 | Liu et al. |
| 2021/0067783 A1 | 3/2021 | Liu et al. |
| 2021/0076050 A1 | 3/2021 | Zhang et al. |
| 2021/0076063 A1 | 3/2021 | Liu et al. |
| 2021/0092379 A1 | 3/2021 | Zhang et al. |
| 2021/0092435 A1 | 3/2021 | Liu et al. |
| 2021/0105482 A1 | 4/2021 | Zhang et al. |
| 2021/0152846 A1 | 5/2021 | Zhang et al. |
| 2021/0203958 A1 | 7/2021 | Zhang et al. |
| 2021/0218980 A1 | 7/2021 | Zhang et al. |
| 2021/0352302 A1 | 11/2021 | Zhang et al. |
| 2021/0392341 A1 | 12/2021 | Zhang et al. |
| 2022/0070488 A1 | 3/2022 | Chen et al. |
| 2022/0070489 A1 | 3/2022 | Zhang et al. |
| 2022/0078452 A1 | 3/2022 | Zhang et al. |
| 2022/0217363 A1 | 7/2022 | Zhang et al. |
| 2022/0264125 A1 | 8/2022 | Zhang et al. |

FOREIGN PATENT DOCUMENTS

| | | |
|---|---|---|
| CN | 1672174 A | 9/2005 |
| CN | 1710959 A | 12/2005 |
| CN | 1777283 A | 5/2006 |
| CN | 101605255 A | 12/2009 |
| CN | 101895751 A | 11/2010 |
| CN | 102577388 A | 7/2012 |
| CN | 103561263 A | 2/2014 |
| CN | 104053005 A | 9/2014 |
| CN | 104170381 A | 11/2014 |
| CN | 104221376 A | 12/2014 |
| CN | 104904207 A | 9/2015 |
| CN | 105306944 A | 2/2016 |
| CN | 105532000 A | 4/2016 |
| CN | 105678808 A | 6/2016 |
| CN | 105723713 A | 6/2016 |
| CN | 105917650 A | 8/2016 |
| CN | 106303543 A | 1/2017 |
| CN | 106416245 A | 2/2017 |
| CN | 106537915 A | 3/2017 |
| CN | 106559669 A | 4/2017 |
| CN | 106688232 A | 5/2017 |
| CN | 107079161 A | 8/2017 |
| CN | 107113424 A | 8/2017 |
| CN | 107113442 A | 8/2017 |
| CN | 107211156 A | 9/2017 |
| CN | 107409225 A | 11/2017 |
| CN | 107426568 A | 12/2017 |
| CN | 107534778 A | 1/2018 |
| CN | 107615765 A | 1/2018 |
| CN | 107852490 A | 3/2018 |
| CN | 107925775 A | 4/2018 |
| CN | 107979756 A | 5/2018 |
| CN | 108012153 A | 5/2018 |
| CN | 108028929 A | 5/2018 |
| CN | 108432250 A | 8/2018 |
| CN | 108632629 A | 10/2018 |
| CN | 112020829 A | 12/2020 |
| GB | 2539213 A | 12/2016 |
| JP | H08186825 A | 7/1996 |
| JP | 2007272733 A | 10/2007 |
| JP | 2011077761 A | 4/2011 |
| JP | 2013098745 A | 5/2013 |
| JP | 2021513818 A | 5/2021 |
| KR | 20200128154 A | 11/2020 |
| TW | 201540047 A | 10/2015 |
| TW | 201709738 A | 3/2017 |
| TW | 201832557 A | 9/2018 |
| WO | 2000065829 A1 | 11/2000 |
| WO | 2009080133 A1 | 7/2009 |
| WO | 2013168407 A1 | 11/2013 |
| WO | 2016048834 A1 | 3/2016 |
| WO | 2016057701 A1 | 4/2016 |
| WO | 2016091161 A1 | 6/2016 |
| WO | 2016138513 A1 | 9/2016 |
| WO | 2016183224 A1 | 11/2016 |
| WO | 2017130696 A1 | 3/2017 |
| WO | 2017118411 A1 | 7/2017 |
| WO | 2017133661 A1 | 8/2017 |
| WO | 2017157264 A1 | 9/2017 |
| WO | 2017157281 A1 | 9/2017 |
| WO | 2017165391 A1 | 9/2017 |
| WO | 2017188509 A1 | 11/2017 |
| WO | 2017195554 A1 | 11/2017 |
| WO | 2017197126 A1 | 11/2017 |
| WO | 2017197146 A1 | 11/2017 |
| WO | 2017206803 A1 | 12/2017 |
| WO | 2018047668 A1 | 3/2018 |
| WO | 2018066241 A1 | 4/2018 |
| WO | 2018067823 A1 | 4/2018 |
| WO | 2018097692 A2 | 5/2018 |
| WO | 2018097693 A3 | 7/2018 |

(56) References Cited

FOREIGN PATENT DOCUMENTS

WO  2018184589 A1  10/2018
WO  2020086331 A1  4/2020

OTHER PUBLICATIONS

Notice of Allowance nfrom U.S. Appl. No. 17/071,357 dated Feb. 2, 2022.
Office Action from Indian Patent Application No. 202127002718 dated Jan. 6, 2022.
Final Office Action from U.S. Appl. No. 17/161,391 dated Jul. 14, 2021.
Non-Final Office Action from U.S. Appl. No. 17/031,451 dated Dec. 4, 2020.
Notice of Allowance from U.S. Appl. No. 17/011,131 dated Dec. 10, 2020.
Non-Final Office Action from U.S. Appl. No. 17/074,842 dated Dec. 23, 2020.
Non-Final Office Action from U.S. Appl. No. 17/074,892 dated Dec. 24, 2020.
Non-Final Office Action from U.S. Appl. No. 17/005,521 dated Jan. 7, 2021.
Notice of Allowance from U.S. Appl. No. 17/071,412 dated Jan. 7, 2021.
Final Office Action from U.S. Appl. No. 17/019,629 dated Feb. 26, 2021.
Non-Final Office Action from U.S. Appl. No. 17/161,391 dated Mar. 25, 2021.
Final Office Action from U.S. Appl. No. 17/005,521 dated Apr. 26, 2021.
Advisory Action from U.S. Appl. No. 17/074,892 dated Aug. 4, 2021.
Non-Final Office Action from U.S. Appl. No. 17/071,357 dated Sep. 21, 2021.
Alshin et al. "Bi-Directional Optical Flow for Improving Motion Compensation," 28th Picture Coding Symposium, PCS2010, Dec. 8, 2010, Nagoya, Japan, pp. 422-425.
Bross et al. "Versatlie Video Coding (Draft 2)," Joint Video Experts Team (JVET) of ITU-T SG 16 WP 3 and ISO/IEC JTC 1/SC 29/WG 11, 11th Meeting, Ljubljana, SI, Jul. 10-18, 2018, document JVET-K1001, 2018.
Bross et al. "Versatile Video Coding (Draft 4)," Joint Video Experts Team (JVET) of ITU-T SG 16 WP 3 and ISO/IEC JTC 1/SC 29/WG 11, 13th Meeting, Marrakech, MA, Jan. 9-18, 2019, document JVET-M1001, 2019.
Bross et al. "Versatile Video Coding (Draft 5)," Joint Video Experts Team (JVET) of ITU-T SG 16 WP 3 and ISO/IEC JTC 1/SC 29/WG 11, 14th Meeting, Geneva, CH, Mar. 19-27, 2019, document JVET-N1001, 2019.
Chen et al. "EE3: Generalized Bi-Prediction," Joint Video Exploration Team (JVET) of ITU-T SG 16 WP 3 and ISO/IEC JTC 1/SC 29/WG 11, 4th Meeting, Chengdu, CN, Oct. 15-21, 2016, document JVET-D0102, 2016.
Chen et al. "Algorithm Description of Joint Exploration Test Model 7 (JEM 7)," Joint Video Exploration Team (JVET) of ITU-T SG 16 WP 3 and ISO/IEC JTC 1/SC 29/WG 11, 7th Meeting, Torino, IT, Jul. 13-21, 2017, document JVET-31001, 2017.
Chen et al. "Description of SDR, HDR and 360 degree Video Coding Technology Proposal by Qualcomm and Technicolor—low and high complexity versions," Joint Video Exploration Team (JVET) of ITU-T SG 16 WP 3 and ISO/EC JTC 1/SC 29/WG 11, 10th Meeting, San Diego, US, Apr. 10-20, 2018, document JVET-J0021, 2018.
Chen et al. "Description of SDR, HDR and 360 degree Video Coding Technology Proposal by Huawei, GoPro, HiSilicon, and Samsung," Joint Video Exploration Team (JVET) of ITU-T SG 16 WP 3 and ISO/IEC JTC 1/SC 29/WG 11, 10th Meeting, San Diego, US, Apr. 10-20, 2018, document JVET-J0025, 2018.

Chen et al. "DMVR Extension baed on Template Matching," Joint Video Exploration Team (JVET) of ITU-T SG 16 WP 3 and ISO/IEC JTC 1/SC 29/WG 11, 10th Meeting, San Diego, US, Apr. 10-20, 2018, document JVET-J0057, 2018.
Chien et al. "Modification of Merge Candidate Derivation," Joint Video Exploration Team (JVET) of ITU-T SG 16 WP 3 and ISO/IEC JTC 1/SC 29/WG 11, 2nd Meeting, San Diego, USA, Feb. 20-26, 2016, document JVET-B0058, 2016.
JEM-7.0: https://jvet.hhi.fraunhofer.de/svn/svn_HMJEMSoftware/tags/ HM-16.6-JEM-7.0. (only website).
Han et al. "CE4-Related: Modification on Merge List," Joint Video Exploration Team (JVET) of ITU-T SG 16 WP 3 and ISO/IEC JTC 1/SC 29/WG 11, 13th Meeting, Marrakech, MA, Jan. 9-18, 2019, document JVET-M0127, 2019.
He et al. "Non-SCCE1: Improved Intra Block Copy Coding with Block Vector Derivation," Joint Collaborative Team on Video Coding (JCT-VC) of ITU-T SG 16 WP 3 and ISO/IEC JTC 1/SC 29/WG 11, 18th Meeting, Sapporo, JP, Jun. 30-Jul. 9, 2017, document JCTVC-R0165, 2014.
"High Efficiency Video Coding" Series H: Audiovisual and Multimedia Systems: Infrastructure of Audiovisual Services—Coding of Moving Video, ITU-T, H.265, 2018.
Hsiao et al. "CE4.2.8: Merge Mode Enhancement," Joint Video Experts Team (JVET of ITU-T SG 16 WP 3 and ISO/EC JTC 1/SC 29/WG 11, 11th Meeting: Ljubljana, SI, Jul. 10-18, 2018, document JVET-K0245, 2018.
H.265/HEVC, https://www.itu.int/rec/T-REC-H.265.
Li et al. "Affine Deformation Model Based Intra Block Copy for Intra Frame Coding," 2020, Institute of Information and Communication Engineering, Zhejiang University.
Li et al. "Multi-Type-Tree." Joint Video Exploration Team (JVET), of ITU-T SG 16 WP 3 and ISO/IEC JTC 1/SC 29/WG 11, 4th Meeting: Chengdu, CN, Oct. 15-21, 2016, document JVET-D0117rl, 2016.
Li et al. "Non-CE4: Harmonization between HMVP and Gbi," Joint Video Experts Team (JVET) of ITU-T SG 16 WP 3 and ISO/IEC JTC 1/SC 29/WG 11, 13th Meeting: Marrakech, MA, Jan. 9-18, 2019, document JVET-M0264, 2019.
Li et al. "Adaptive Motion Vector Resolution for Screen Content," Joint Collaborative Team on Video Coding (JCT-VC) of ITU-T SG 16 WP 3 and ISO/IEC JTC 1/SC 29/WG 11, 19th Meeting, Strasbourg, FR, Oct. 17-24, 2014, document JCTVC-S0085, 2014.
Li et al. "Combining Directional Intra Prediction and Intra Block Copy with Block Partitioning for HEVC," 2016 IEEE International Conference on Image Processing (ICIP), Phoenix, AZ, USA, 2016, pp. 524-528.
Luthra et al. Overview of the H.264/AVC Video Coding Standard, Proc. SPIE, 5203, Applications of Digital Image Processing, Nov. 19, 2003, Optical Science and Technology, SPIE 48th annutal Meeting, San Diego, CA, US, 2003.
Su et al. "CE4.4.1: Generalized Bi-Prediction for Intercoding," Joint Video Exploration Team of ISO/IEC JTC 1/SC 29/WG 11 and ITU-T SG 16, Ljubljana, Jul. 11-18, 2018, document No. JVET-K0248, 2018.
Sullivan et al. "Overview of the High Efficiency Video Coding (HEVC) Standard," IEEE Transactions on Circuits and Systems for Video Technology, Dec. 2012, 22(12):1649-1668.
Sullivan et al. "Meeting Report of the 18th Meeting of the Joint Collaborative Team on Video Coding (JCT-VC), Sapporo, JP, Jun. 30-Jul. 9, 2014", Joint Collaborative Team on Video Coding (JCT-VC) of ITU-T SG16 WP3 and ISO/IEC JTC1/SC29/WG11, 18th Meeting: Sapporo, JP, Jun. 30-Jul. 9, 2014, JCTVC-R_Notes_d, 2014.
Toma et al. "Description of SDR Video Coding Technology Proposal by Panasonic," Joint Video Experts Team (JVET) of ITU-T SG 16 WP 3 and ISO/IEC JTC 1/SC 29/WG 11, 10th Meetingmm San Diego, US, Apr. 10-20, 2018, document JVET-J0020, 2018.
Van Der Auwera et al. "Description of Core Experiment 3: Intra Prediction and Mode Coding," Joint Video Experts Feam (JVET) of ITU-T SG 16 WP 3 and ISO/IEC JTC 1/SC 29/WG 11, 10th Meeting, San Diego, USA, Apr. 10-20, 2018. document JVET-J1023, 2018.

(56) References Cited

OTHER PUBLICATIONS

Xu et al. "Intra Block Copy in HEVC Screen Content Coding Extensions," IEEE Journal on Emerging and Selected Topics in Circuits and Systems, Dec. 2016, 6(4):409-419.

Xu et al. "CE8-Related Combination Test of JVET-N0176/JVET-N0317/JVET-N0382 on Simplification of IBC Vector Prediction," Joint Video Experts Team (JVET) of ITU-T SG 16 WP3 and ISO/IEC JTC 1/SC 29/WG 11, 14th Meeting, Geneva, CH, Mar. 19-27, 2019, document JVET-N0843, 2019.

Yang et al. "Description of Core Experiment 4 (CE4): Inter Prediction and Motion Vector Coding," Joint Video Experts Feam (JVET) of ITU-T SG 16 WP 3 and ISO/IEC JTC 1/SC 29/WG 11, 11th Meeting, Ljubljana, SI, Jul. 10-18, 2018, document JVET-K1024, 2018.

Zhang et al. "Rotate Intra Block Copy for Still Image Coding," 2015 IEEE International Conference on Image Processing (ICIP), IEEE, Sep. 27, 2015, pp. 4102-4106.

Zhang et al. "CE4-related: History-based Motion Vector Prediction", Joint Video Experts Team (JVET) of ITU-T SG 16 WP 3 and ISO/IEC JTC 1/SC 29/WG 11, 11th Meeting, Ljubljana, SI, Jul. 10-18, 2018, Document JVET-K0104, 2018.

Zhang et al. "CE4.2.14: Planar Motion Vector Prediction," Joint Video Experts Team (JVET) of ITU-T SG 16 and WP 3 and ISO/IEC JTC 1/SC 29/WG 11, 11th Meeting: Ljubljaba, SI, Jul. 10-18, 2018, document JVET-K0135, 2018.

Zhang et al. "BoG Report on CE4 Related Contributions," Joint Video Experts Team (JVET) of ITU-T SG 16 WP 3 and ISO/IEC JTC 1/SC 29/WG 11, 13th Meeting: Marrakech, MA, Jan. 9-18, 2019, document JVET-M0843, 2019.

Zhang et al. "On Adaptive Motion Vector Resolution," Joint Collaborative Team on Video Coding (JCT-VC) of ITU-T SG 16 WP 3 and ISO/IEC JTC 1/SC 29/WG 11, 20th Meeting, Geneva, CH, Feb. 10-18, 2015, document JCTVC-T0059, 2015.

Zou et al. "Improved Affine Motion Prediction," Joint Video Exploration Team (JVET) of ITU-T SG 16 WP3 and ISO/EC JTC 1/SC 29/WG 11, 3rd Meeting, Geneva, CH, May 26-Jun. 1, 2016, document JVET-C0062, 2016.

Zhou et al. "Spatial-Temporal Merge Mode (Non Subblock STMVP)," Joint Video Exploration Team (JVET) of ITU-T SG 16 WP 3 and ISO/IEC JTC 1/SC 29/WG 11, 11th Meeting: Ljubljana, SI, Jul. 10-18, 2018, document JVET-K0532, and JVET-K0161, 2018.

International Search Report and Written Opinion from PCT/IB2019/054602 dated Aug. 21, 2019 (17 pages).

International Search Report and Written Opinion from PCT/IB2019/054604 dated Sep. 26, 2019 (17 pages).

International Search Report and Written Opinion from PCT/IB2019/054611 dated Aug. 29, 2019 (88 pages).

International Search Report and Written Opinion from PCT/IB2019/054612 dated Sep. 26, 2019 (17 pages).

International Search Report and Written Opinion from PCT/IB2019/054614 dated Aug. 27, 2019 (14 pages).

International Search Report and Written Opinion from PCT/IB2019/054650 dated Oct. 28, 2019 (20 pages).

International Search Report and Written Opinion from PCT/IB2019/054652 dated Sep. 27, 2019 (18 pages).

International Search Report and Written Opinion from PCT/IB2019/054654 dated Aug. 27, 2019 (85 pages).

International Search Report and Written Opinion from PCT/IB2019/058078 dated Mar. 3, 2020(20 pages).

International Search Report and Written Opinion from PCT/IB2019/058079 dated Mar. 3, 2020(26 pages).

International Search Report and Written Opinion from PCT/IB2019/058081 dated Mar. 25, 2020(21 pages).

Non-Final Office Action from U.S. Appl. No. 17/019,629 dated Nov. 13, 2020.

Non-Final Office Action from U.S. Appl. No. 17/011,157 dated Nov. 17, 2020.

Hsiao et al. "CE4.4.12: Pairwise Average Candidates," Joint Video Experts Team (JVET) of ITU-T SG 16 WP 3 and ISO/IEC JTC 1/SC 29/WG 11, 12th Meeting, Macao, CN, Oct. 3-12, 2018, document JVET-L0090, 2019.

Hsu et al. "Description of SDR Video Coding Technology Proposal by MediaTek," Joint Video Experts Team (JVET) of ITU-T SG 16 WP 3 and ISO/IEC JTC 1/SC 29/WG 11, 10th Meeting, San Diego, US, Apr. 10-20, 2018, document JVET-J0018, 2018.

Lee et al. "Unified Condition for Affine Merge and Affine Inter Mode," Joint Video Exploration Team (JVET) of ITU-T SG 16 WP 3 and ISO/IEC JTc 1/SC 29/WG 11, 5th Meeting, Geneva, CH, Jan. 12-20, 2017, JVET-E0039, 2017.

Liao et al. "CE10.1.b: Triangular Prediction Unit Mode," Joint Video Exploration Team (JVET) of ITU-T SG 16 WP 3 and ISO/IEC JTC 1/SC 29/WG 11, 12th Meeting, Macao, CN, Oct. 3-12, 2018, document JVET-L0124. 2018.

Zhang et al. "CE4-Related: Simplified Affine Prediction," Joint Video Experts Team (JVET) of ITU-T SG 16 WP 3 and ISO/IEC JTC 1/SC 29/WG 11, 11th Meeting, Ljubljana, SI, Jul. 10-18, 2018, document JVET-K0103. 2018.

Zhang et al. "CE4: Affine Prediction with 4x4 Sub-blocks for Chroma Components (Test 4.1.16)," Joint Video Experts Team (JVET) of ITU-T SG 16 WP 3 and ISO/IEC JTC 1/SC 29/WG 11, 12th Meeting, Macao, CN, Oct. 3-12, 2018, document JVET-L0265, 2018.

Zhang et al. "CE3-Related: Modified Chroma Derived Mode," Joint Video Experts Team (JVET) of ITU-T SG 16 WP 3 and ISO/IEC JTC 1/SC 29/WG 11, 12th Meeting, Macao, CN, Oct. 3-12, 2018, document JVET-L0272, 2018.

Zhang et al. "Adaptive Motion Vector Resolution Rounding Align," Joint Video Experts Team (JVET) of ITU-T SG 16 WP 3 and ISO/IEC JTC 1/SC 2/WG 11, 12th Meeting, Macao, CN, Oct. 3-12, 2018, document JVET-L0377, 2018.

International Search Report and Written Opinion from PCT/CN2019/117116 dated Jan. 2, 2020 (9 pages).

International Search Report and Written Opinion from PCT/CN2019/117118 dated Feb. 5, 2020 (9 pages).

International Search Report and Written Opinion from PCT/CN2019/117119 dated Jan. 23, 2020 (9 pages).

International Search Report and Written Opinion from PCT/IB2019/055244 dated Nov. 18, 2019 (18 pages).

International Search Report and Written Opinion from PCT/IB2019/055246 dated Nov. 7, 2019 (18 pages).

International Search Report and Written Opinion from PCT/IB2019/055247 dated Nov. 7, 2019 (21 pages).

Non-Final Office Action from U.S. Appl. No. 17/071,357 dated Dec. 8, 2020.

Non-Final Office Action from U.S. Appl. No. 17/099,042 dated Dec. 31, 2020.

Huang, Wanzhang, "Research on Side Information Generation of Distributed Video Coding," South China University of Technology, Guangzhou, China, 2012. (cited in CN201910487926.0 OA dated Feb. 18, 2022).

Jang et al. "Non-CE8: Modification on SbTMVP Process Regarding with CPR," Joint Video Experts Team (JVET) of ITU-T SG 16 WP3 and ISO/IEC JTC 1/SC 29/WG 11, 13th Meeting, Marrakech, MA, Jan. 9-18, 2019, document JVET-M0335, 2019. (cited in JP2020-568474 OA dated Feb. 8, 2022).

Lai et al. "CE8-Related: Clarification on Interaction Between CPR and other Inter Coding Tools," Joint Video Experts feram (JVET) of ITU-T SG 16 WP 3 and ISO/IEC JTC 1/SC 29/WG 11, 13th Meeting, Marrakech, MA, Jan. 9-18, 2019, document JVET-M0175, 2019. (cited in JP2020-568474 OA dated Feb. 8, 2022).

Solovyev et al. "Non-CE4: Merge Mode Modification," Joint Video Experts Team (JVET) of ITU-T SG 16 WP 3 and ISO/IEC JTC 1/SC 29/WG 11 11th Meeting: Ljubljana, SI, Jul. 10-18, 2018, document JVET-K0056, 2018. (cited in CN201910907742.5 OA dated Apr. 8, 2022).

Xu et al. "Non-CE8: Mismatch Between Text Specification and Reference Software on ATMVP Candidate Derivation When CPR is Enabled," Joint Video Experts Team (JVET) of ITU-T SG 16 WP

(56) References Cited

OTHER PUBLICATIONS 3 and ISO/IEC JTC 29/WG 11, 13th Meeting, Marrakech, MA, Jan. 9-18, 2019, document JVET-M0409, 2019. (cited in JP2020-568474 OA dated Feb. 8, 2022).

Yang et al. "BoG Report on CE4 Related Contributions," Joint Video Experts Team (JVET) of ITU-T SG 16 WP 3 and ISO/IEC JTC 1/SC 29/WG 11 11th Meeting: Ljubljana, SI, Jul. 10-18, 2018, document JVET-K0546, 2018. (cited in CN201910907742.5 OA dated Apr. 8, 2022).

Zhao et al. "Intra Mini-Block Copy Algorithm for Screen Content Coding," Journal of Computer Applications, 2016, 36(7): 1938-1943. (cited in CN201910487926.0 OA dated Feb. 18, 2022).

Zuo et al. "Intra Block Copy for Intra-Frame Coding," Joint Video Experts Team (JVET) of ITU-T SG 16 WP 3 and ISO/IEC JTC 1/SC 29/WG 11 10th Meeting: San Diego, US, Apr. 10-20, 2018, document JVET-J0042, 2018. (cited in CN201910487926.0 OA dated Feb. 18, 2022).

Non Final Office Action from U.S. Appl. No. 17/019,629 dated Jun. 8, 2022.

Bross et al. "Versatile Video Coding (Draft 3)," Joint Video Experts Team (JVET) of ITU-T SG 16 WP 3 and ISO/IEC JTC 1/SC 29/WG 11 12th Meeting, Macao, CN, Oct. 3-12, 2018. document JVET-L1001, 2018.

Zhang et al. "AHG16: Clean-up on MV Rounding," Joint Video Experts Team (JVET) of ITU-T SG 16 WP 3 and ISO/IEC JTC 1/SC 29/WG 11, 13th Meeting, Marrakech, MA Jan. 9-18, 2019, document JVET-M0265, 2019.

Extended European Search Report from European Patent Application No. 19882864.2 dated Mar. 21, 2022 (9 pages).

Koyama et al. "Modification of Derivation Process of Motion Vector Information for Interlace Format," Joint Collaborative Team on Video Coding (JCT-VC) of ITU-T SG16 WP3 and ISO/IEC JTC1/SC29/WG11 7th Meeting: Geneva, CH, Nov. 21-30, 2011, document JCTVC-G196, 2011. (cited in JP2021-524354 OA dated Aug. 2, 2022).

Shimada et al. "Non-CE9/Non-CE13: Averaged Merge Candidate," Joint Collaborative Team on Video Coding (JCT-VC)of ITU-T SG16 WP3 and ISO/IEC JTC1/SC29/WG11 7th Meeting: Geneva, CH, Nov. 21-30, 2011, document JCTVC-G195,2011. (cited in JP2021-524354 OA dated Aug. 2, 2022).

Han et al. " A Dynamic Motion Vector Referencing Scheme for Video Coding," 2016 IEEE International Conference on Image Processing (ICIP), 2016, pp. 2032-2036.

Non Final Office Action from U.S. Appl. No. 17/210,797 dated Aug. 2, 2022.

Non Final Office Action from U.S. Appl. No. 17/529,607 dated Oct. 31, 2022.

Non Final Office Action from U.S. Appl. No. 17/525,745 dated Nov. 10, 2022.

Non Final Office Action from U.S. Appl. No. 17/412,771 dated Feb. 16, 2023.

Non Final Office Action from U.S. Appl. No. 17/732,849 dated Mar. 2, 2023.

Examination Report from Indian Patent Application No. 202228045435 dated Dec. 26, 2022.

\* cited by examiner

SUB-BLOCK MV INHERITANCE BETWEEN COLOR COMPONENTS

CROSS REFERENCE TO RELATED APPLICATIONS

This application is a continuation of U.S. application Ser. No. 17/071,412, filed on Oct. 15, 2020, which is a continuation of International Application No. PCT/IB2019/055247, filed on Jun. 21, 2019, which claims the priority to and benefits of International patent Application No. PCT/CN2018/092118, filed on Jun. 21, 2018, PCT/CN2018/114931, filed on Nov. 10, 2018. All the aforementioned patent applications are hereby incorporated by reference in their entireties.

TECHNICAL FIELD

This patent document is directed generally to image and video coding technologies.

BACKGROUND

Motion compensation is a technique in video processing to predict a frame in a video, given the previous and/or future frames by accounting for motion of the camera and/or objects in the video. Motion compensation can be used in the encoding and decoding of video data for video compression.

SUMMARY

Devices, systems and methods related to sub-block based prediction for image and video coding are described.

In one representative aspect, the disclosed technology may be used to provide a method for video encoding. This method includes partitioning a first component of a current video block into a first set of sub-blocks and partitioning a second component of the current video block into a second set of sub-blocks. A sub-block of the second component corresponds to one or more sub-blocks of the first component. The method also includes deriving, based on a color format of the current video block, motion vectors for the sub-block of the second component based on motion vectors for one or more corresponding sub-blocks of the first color component.

In another representative aspect, the disclosed technology may be used to provide a method for video decoding. The method includes receiving a block of video data that comprises a first component and at least a second component. The first component is partitioned into a first set of sub-blocks and the second component is partitioned into a second set of sub-blocks. A sub-block of the second component corresponds to one or more sub-blocks of the first component. The method includes deriving, based on a color format of the block of video data, motion vectors for a sub-block of the second component based on motion vectors for one or more corresponding sub-blocks of the first color component. The method also includes reconstructing, based on the derived motion vectors, the block of video data or decoding other blocks of video data in a same picture.

In yet another representative aspect, the above-described method is embodied in the form of processor-executable code and stored in a computer-readable program medium.

In yet another representative aspect, a device that is configured or operable to perform the above-described method is disclosed. The device may include a processor that is programmed to implement this method.

In yet another representative aspect, a video encoder or a video decoder apparatus may implement a method as described herein.

The above and other aspects and features of the disclosed technology are described in greater detail in the drawings, the description and the claims.

DETAILED DESCRIPTION

Due to the increasing demand of higher resolution video, video coding methods and techniques are ubiquitous in modern technology. Video codecs typically include an electronic circuit or software that compresses or decompresses digital video, and are continually being improved to provide higher coding efficiency. A video codec converts uncompressed video to a compressed format or vice versa. There are complex relationships between the video quality, the amount of data used to represent the video (determined by the bit rate), the complexity of the encoding and decoding algorithms, sensitivity to data losses and errors, ease of editing, random access, and end-to-end delay (latency). The compressed format usually conforms to a standard video compression specification, e.g., the High Efficiency Video Coding (HEVC) standard (also known as H.265 or MPEG-H Part 2), the Versatile Video Coding standard to be finalized, or other current and/or future video coding standards.

Figure 1:
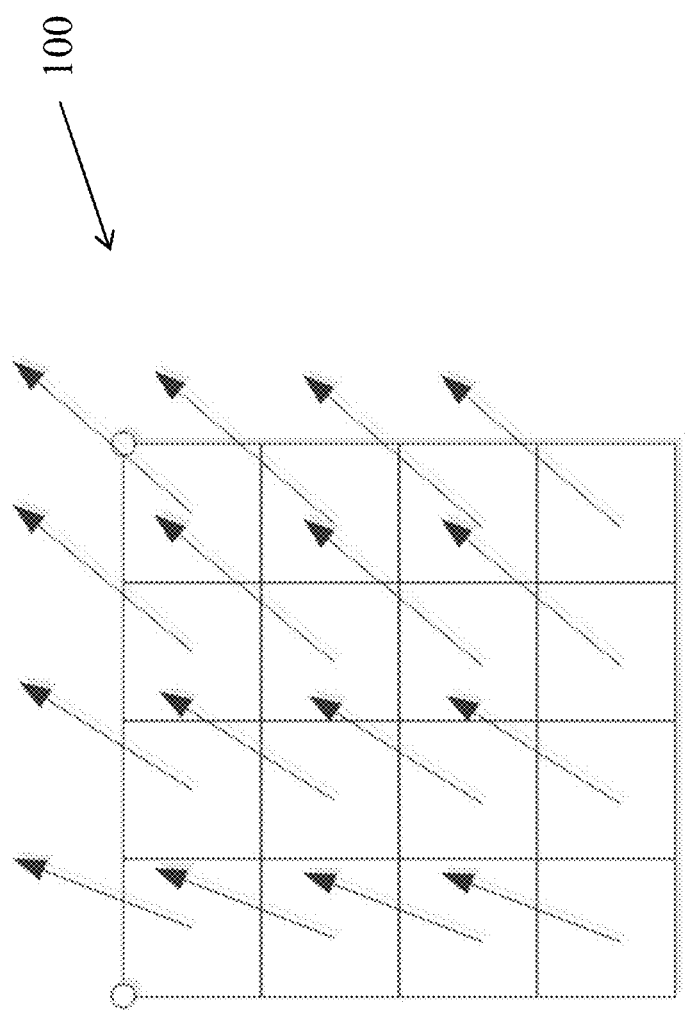
FIG. 1 shows an example of sub-block based prediction.

Sub-block based prediction is first introduced into the video coding standard by the High Efficiency Video Coding (HEVC) standard. With sub-block based prediction, a block, such as a Coding Unit (CU) or a Prediction Unit (PU), is divided into several non-overlapped sub-blocks. Different sub-blocks may be assigned different motion information, such as reference index or motion vector (MV), and motion compensation (MC) is performed individually for each sub-block. FIG. 1 shows an example of sub-block based prediction.

Embodiments of the disclosed technology may be applied to existing video coding standards (e.g., HEVC, H.265) and future standards to improve runtime performance. Section headings are used in the present document to improve readability of the description and do not in any way limit the discussion or the embodiments (and/or implementations) to the respective sections only.

Future video coding technologies are explored using a reference software known as the Joint Exploration Model (JEM). In JEM, sub-block based prediction is adopted in several coding tools, such as affine prediction, alternative temporal motion vector prediction (ATMVP), spatial-temporal motion vector prediction (STMVP), bi-directional optical flow (BIO), Frame-Rate Up Conversion (FRUC), Locally Adaptive Motion Vector Resolution (LAMVR), Overlapped Block Motion Compensation (OBMC), Local Illumination Compensation (LIC), and Decoder-side Motion Vector Refinement (DMVR).

Figure 2:
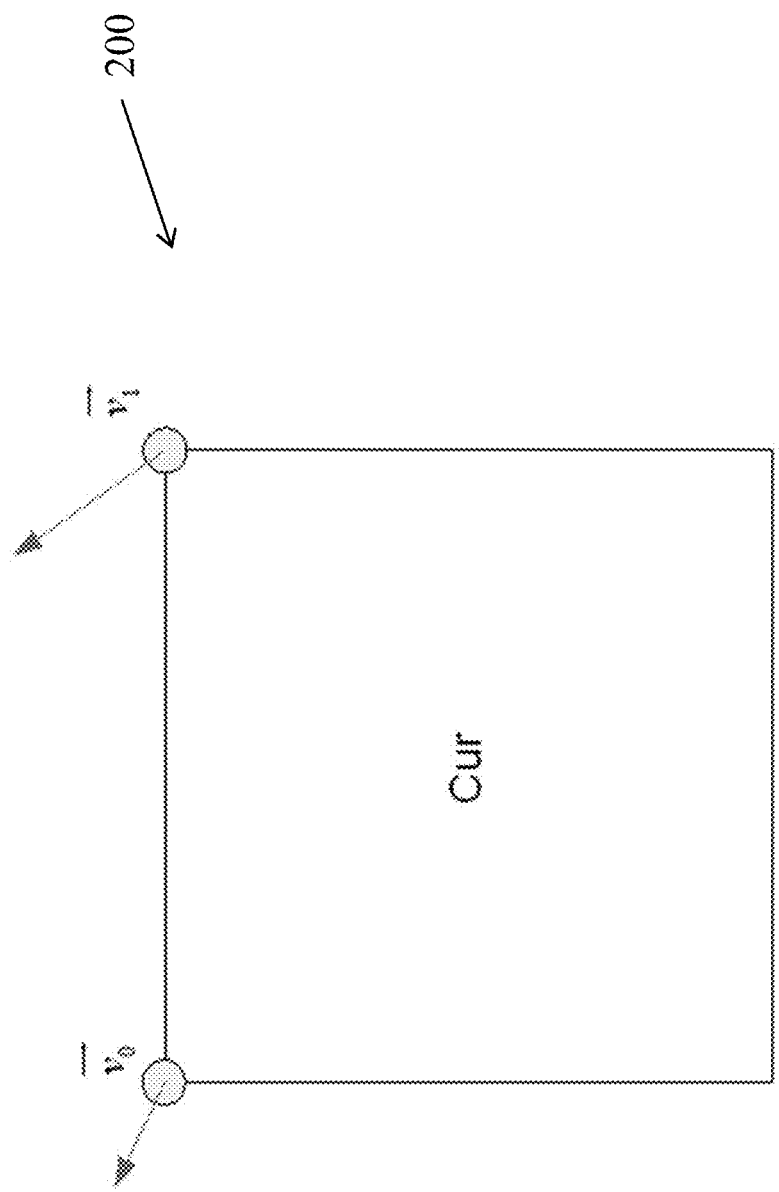
FIG. 2 shows an example of a simplified affine motion model.

In HEVC, only a translation motion model is applied for motion compensation prediction (MCP). However, the camera and objects may have many kinds of motion, e.g. zoom in/out, rotation, perspective motions, and/or other irregular motions. JEM, on the other hand, applies a simplified affine transform motion compensation prediction. FIG. 2 shows an example of an affine motion field of a block 200 described by two control point motion vectors $V_0$ and $V_1$. The motion vector field (MVF) of the block 200 can be described by the following equation:

$$\begin{cases} v_x = \frac{(v_{1x} - v_{0x})}{w}x - \frac{(v_{1y} - v_{0y})}{w}y + v_{0x} \\ v_y = \frac{(v_{1y} - v_{0y})}{w}x + \frac{(v_{1x} - v_{0x})}{w}y + v_{0y} \end{cases} \quad \text{Eq. (1)}$$

Figure 3:
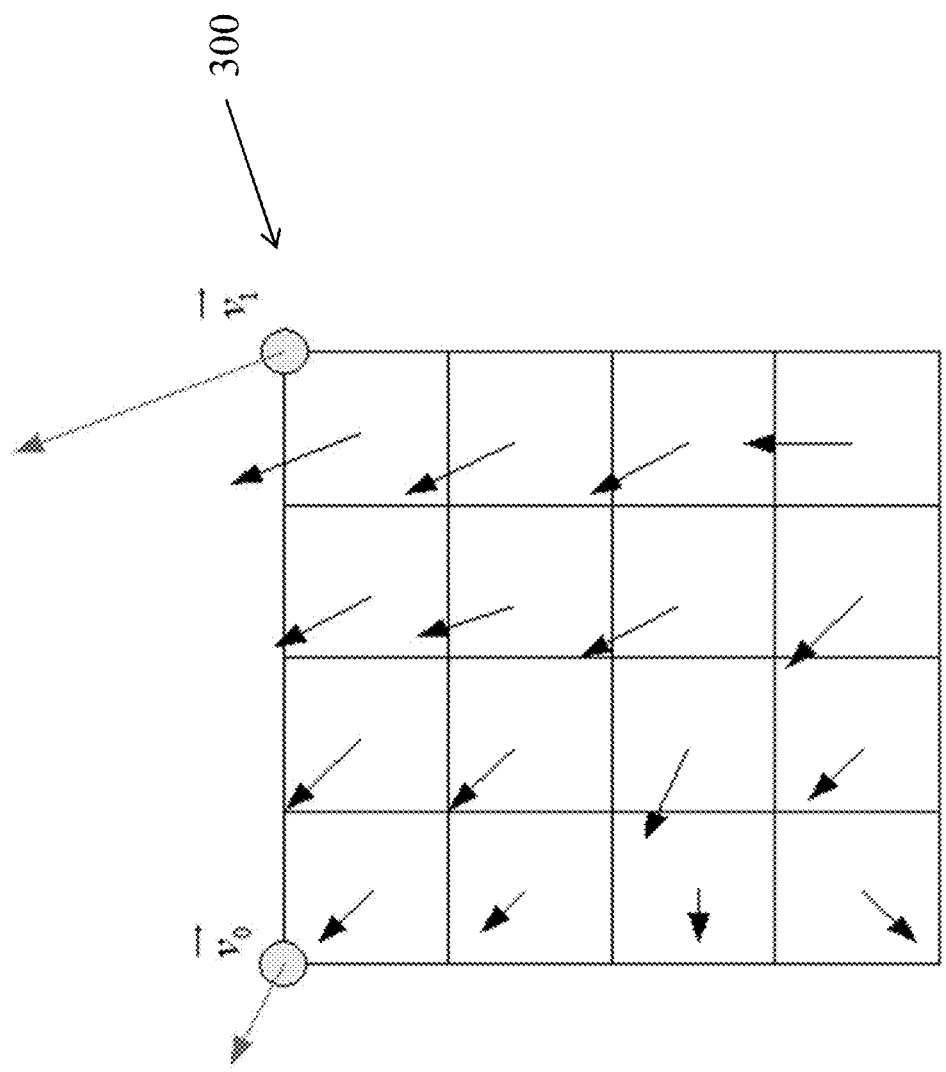
FIG. 3 shows an example of an affine motion vector field (MVF) per sub-block.

FIG. 3 shows an example of affine MVF per sub-block for a block 300. To derive motion vector of each M×N sub-block, the motion vector of the center sample of each sub-block can be calculated according to Eq. (1), and rounded to the motion vector fraction accuracy (e.g., 1/16 in JEM). Then the motion compensation interpolation filters can be applied to generate the prediction of each sub-block with derived motion vector. After the MCP, the high accuracy motion vector of each sub-block is rounded and saved as the same accuracy as the normal motion vector.

In the JEM, there are two affine motion modes: AF_INTER mode and AF_MERGE mode. For CUs with both width and height larger than 8, AF_INTER mode can be applied. An affine flag in CU level is signaled in the bitstream to indicate whether AF_INTER mode is used. In the AF_INTER mode, a candidate list with motion vector pair $\{(v_0, v_1)|v_0=\{v_A, v_B, v_c\}, v_1=\{v_D,v_E\}\}$ is constructed using the neighboring blocks.

In JEM, the non-merge affine mode can be used only when the width and the height of the current block are both larger than 8; the merge affine mode can be used only when the area (i.e. width×height) of the current block is not smaller than 64.

Figure 4:
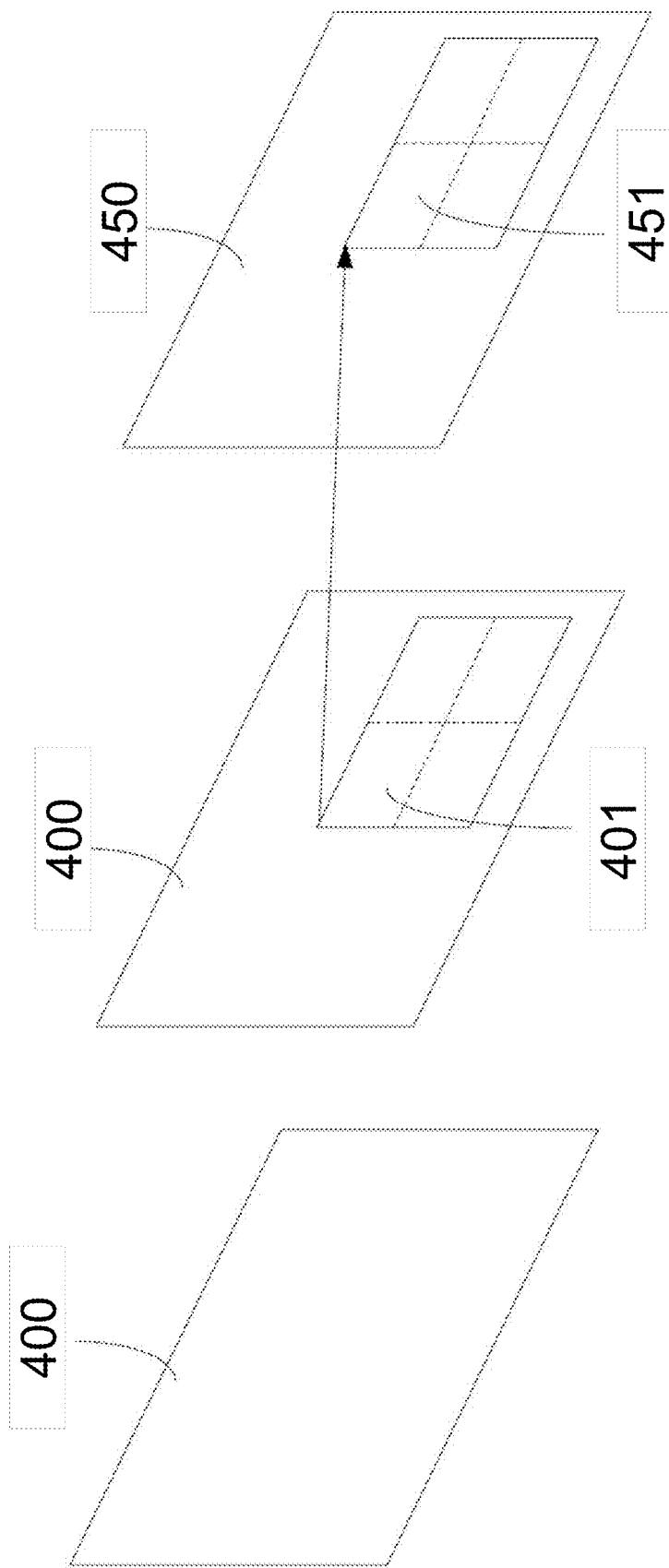
FIG. 4 shows an example of motion prediction using the alternative temporal motion vector prediction (ATMVP) algorithm for a coding unit (CU).

FIG. 4 shows an example of alternative temporal motion vector prediction (ATMVP) motion prediction process for a CU 400. The ATMVP method predicts the motion vectors of the sub-CUs 401 within a CU 400 in two steps. The first step is to identify the corresponding block 451 in a reference picture 450 with a temporal vector. The reference picture 450 is also referred to as the motion source picture. The second step is to split the current CU 400 into sub-CUs 401 and obtain the motion vectors as well as the reference indices of each sub-CU from the block corresponding to each sub-CU.

In the first step, a reference picture 450 and the corresponding block is determined by the motion information of the spatial neighboring blocks of the current CU 400. In the second step, a corresponding block of the sub-CU 451 is identified by the temporal vector in the motion source picture 450, by adding to the coordinate of the current CU the temporal vector. For each sub-CU, the motion information of its corresponding block (e.g., the smallest motion grid that covers the center sample) is used to derive the motion information for the sub-CU. After the motion information of a corresponding N×N block is identified, it is converted to the motion vectors and reference indices of the current sub-CU, in the same way as TMVP of HEVC, wherein motion scaling and other procedures apply.

Figure 5:
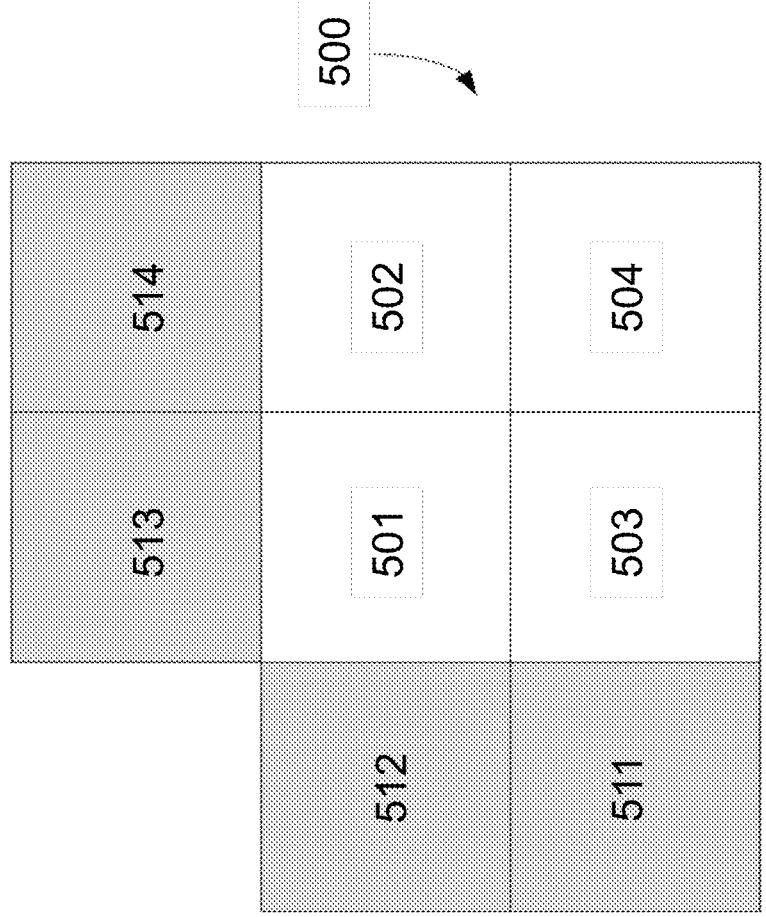
FIG. 5 shows an example of one CU with four sub-blocks and neighboring blocks.

In the Spatial-Temporal Motion Vector Prediction (STMVP) method, the motion vectors of the sub-CUs are derived recursively, following raster scan order. FIG. 5 shows an example of one CU with four sub-blocks and neighboring blocks. Consider an 8×8 CU 500 that includes four 4×4 sub-CUs A (501), B (502), C (503), and D (504). The neighboring 4×4 blocks in the current frame are labelled as a (511), b (512), c (513), and d (514).

The motion derivation for sub-CU A starts by identifying its two spatial neighbors. The first neighbor is the N×N block above sub-CU A 501 (block c 513). If this block c (513) is not available or is intra coded the other N×N blocks above sub-CU A (501) are checked (from left to right, starting at block c 513). The second neighbor is a block to the left of the sub-CU A 501 (block b 512). If block b (512) is not available or is intra coded other blocks to the left of sub-CU A 501 are checked (from top to bottom, staring at block b 512). The motion information obtained from the neighboring blocks for each list is scaled to the first reference frame for a given list. Next, temporal motion vector predictor (TMVP) of sub-block A 501 is derived by following the same procedure of TMVP derivation as specified in HEVC. The motion information of the collocated block at block D 704 is fetched and scaled accordingly. Finally, after retrieving and scaling the motion information, all available motion vectors are averaged separately for each reference list. The averaged motion vector is assigned as the motion vector of the current sub-CU.

The bi-directional optical flow (BIO) method is a sample-wise motion refinement performed on top of block-wise motion compensation for bi-prediction. In some implementations, the sample-level motion refinement does not use signaling.

Let $I^{(k)}$ be the luma value from reference k (k=0, 1) after block motion compensation, and $\partial I^{(k)}/\partial x$, $\partial I^{(k)}/\partial y$ are horizontal and vertical components of the $I^{(k)}$ gradient, respectively. Assuming the optical flow is valid, the motion vector field $(v_x, v_y)$ is given by:

$$\partial I^{(k)}/\partial t + v_x \partial I^{(k)}/\partial x + v_y \partial I^{(k)}/\partial y = 0. \quad \text{Eq. (2)}$$

Combining this optical flow equation with Hermite interpolation for the motion trajectory of each sample results in a unique third-order polynomial that matches both the function values $I^{(k)}$ and $\partial I^{(k)}/\partial x$, $\partial I^{(k)}/\partial y$ derivatives at the ends. The value of this polynomial at t=0 is the BIO prediction:

$$pre_{BIO} = \frac{1}{2} \cdot (I^{(0)} + I^{(1)} + v_x/2 \cdot (\tau_1 \partial I^{(1)}/\partial x - \tau_0 \partial I^{(0)}/\partial x) + v_y/2 \cdot (\tau_1 \partial I^{(1)}/\partial y - \tau_0 \partial I^{(0)}/\partial y)). \quad \text{Eq. (3)}$$

Figure 6:
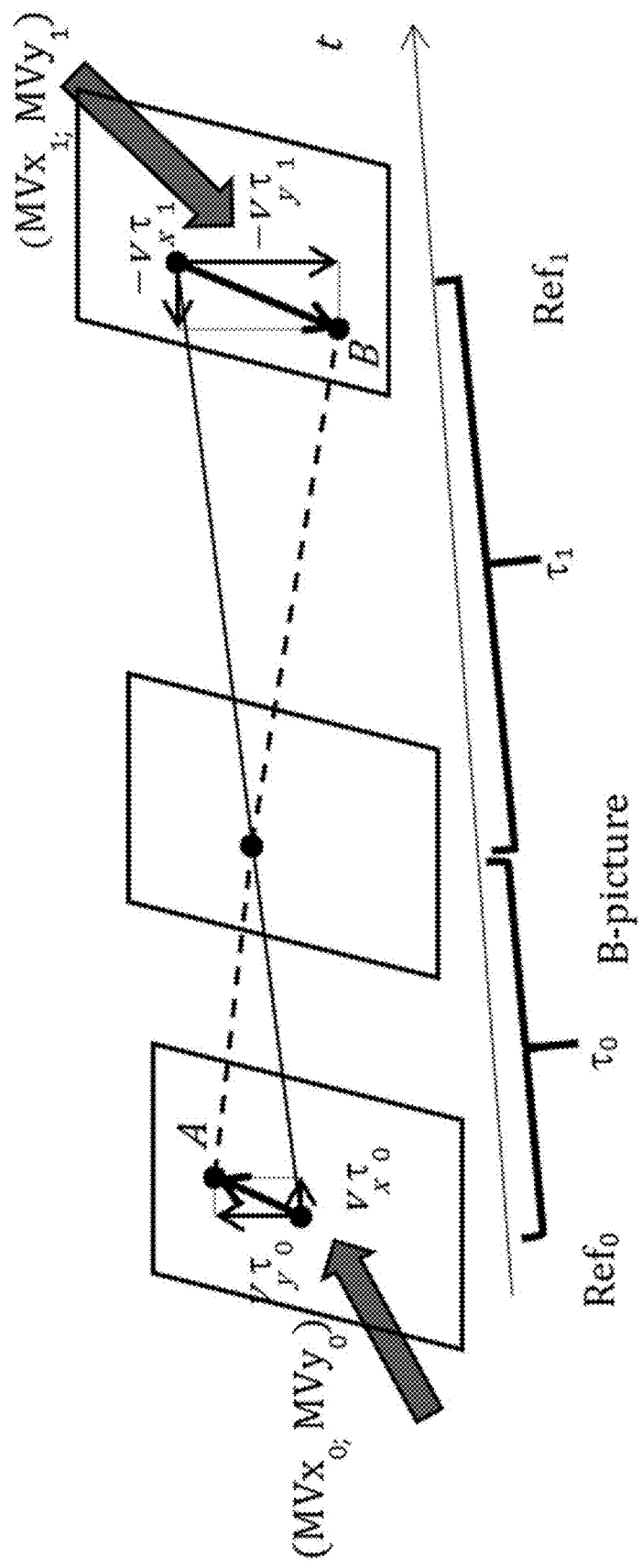
FIG. 6 shows an example of an optical flow trajectory used by the bi-directional optical flow (BIO) algorithm.

FIG. 6 shows an example optical flow trajectory in the Bi-directional Optical flow (BIO) method. Here, $\tau_0$ and $\tau_1$ denote the distances to the reference frames. Distances $\tau_0$ and $\tau_1$ are calculated based on POC for $\text{Ref}_0$ and $\text{Ref}_1$: $\tau_0 = \text{POC(current)} - \text{POC}(\text{Ref}_0)$, $\tau_1 = \text{POC}(\text{Ref}_1) - \text{POC(current)}$. If both predictions come from the same time direction (either both from the past or both from the future) then the signs are different (e.g., $\tau_0 \cdot \tau_1 < 0$). In this case, BIO is applied if the prediction is not from the same time moment (e.g., $\tau_0 \neq \tau_1$). Both referenced regions have non-zero motion (e.g., $MVx_0, MVy_0, MVx_1, MVy_1 \neq 0$) and the block motion vectors are proportional to the time distance (e.g., $MVx_0/MVx_1 = MVy_0/MVy_1 = -\tau_0/\tau_1$). In the JEM, BIO can be applied to all bi-predicted blocks when the two predictions are from different reference pictures. When Local Illumination Compensation (LIC) is enabled for a CU, BIO can be disabled.

In some cases, a FRUC flag can be signaled for a CU when its merge flag is true. When the FRUC flag is false, a merge index can be signaled and the regular merge mode is used. When the FRUC flag is true, an additional FRUC mode flag can be signaled to indicate which method (e.g., bilateral matching or template matching) is to be used to derive motion information for the block.

At the encoder side, the decision on whether using FRUC merge mode for a CU is based on RD cost selection as done for normal merge candidate. For example, multiple matching modes (e.g., bilateral matching and template matching) are checked for a CU by using RD cost selection. The one leading to the minimal cost is further compared to other CU modes. If a FRUC matching mode is the most efficient one, FRUC flag is set to true for the CU and the related matching mode is used.

Typically, motion derivation process in FRUC merge mode has two steps: a CU-level motion search is first performed, then followed by a Sub-CU level motion refinement. At CU level, an initial motion vector is derived for the whole CU based on bilateral matching or template matching. First, a list of MV candidates is generated and the candidate that leads to the minimum matching cost is selected as the starting point for further CU level refinement. Then a local search based on bilateral matching or template matching around the starting point is performed. The MV results in the minimum matching cost is taken as the MV for the whole CU. Subsequently, the motion information is further refined at sub-CU level with the derived CU motion vectors as the starting points.

Figure 7:
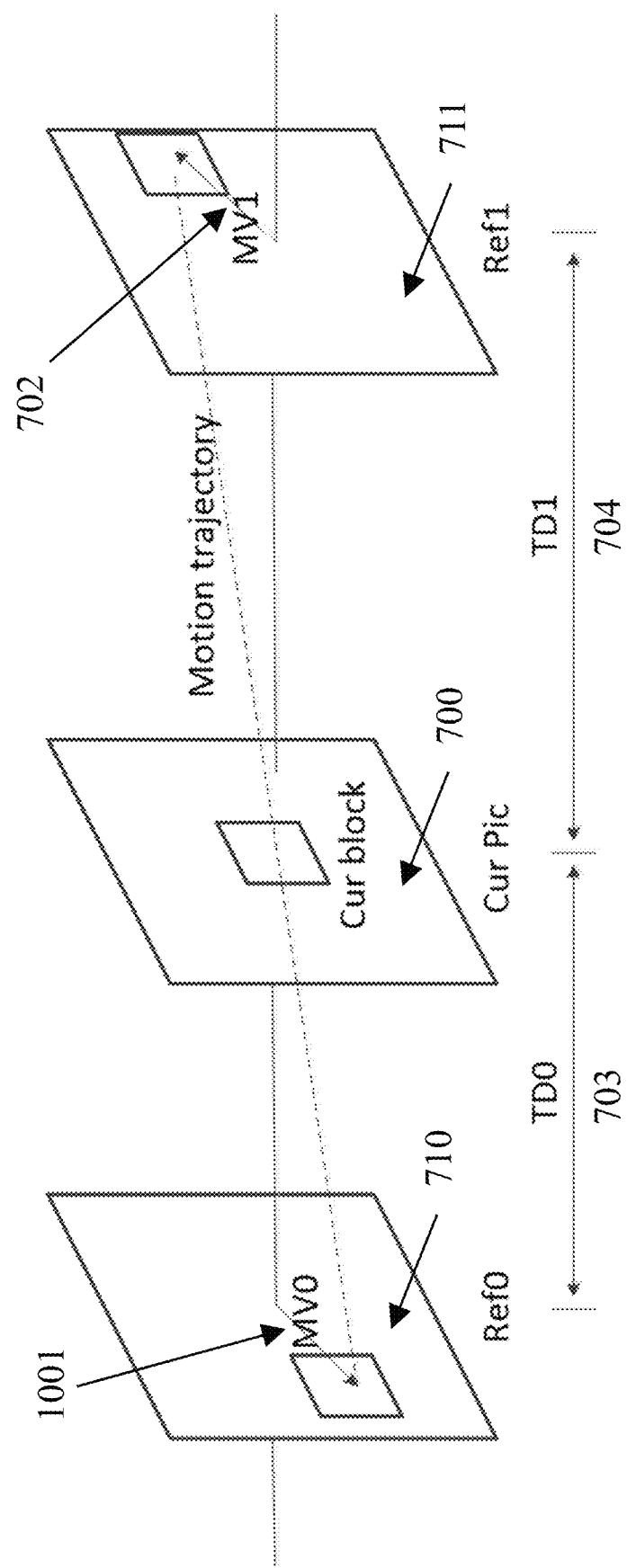
FIG. 7 shows an example of bilateral matching in the frame-rate up conversion (FRUC) algorithm.

FIG. 7 shows an example of bilateral matching used in the Frame-Rate Up Conversion (FRUC) method. The bilateral matching is used to derive motion information of the current CU by finding the closest match between two blocks along the motion trajectory of the current CU (700) in two different reference pictures (710, 711). Under the assumption of continuous motion trajectory, the motion vectors MV0 (701) and MV1 (702) pointing to the two reference blocks are proportional to the temporal distances, e.g., TD0 (703) and TD1 (704), between the current picture and the two reference pictures. In some embodiments, when the current picture 700 is temporally between the two reference pictures (710, 711) and the temporal distance from the current picture to the two reference pictures is the same, the bilateral matching becomes mirror based bi-directional MV.

Figure 8:
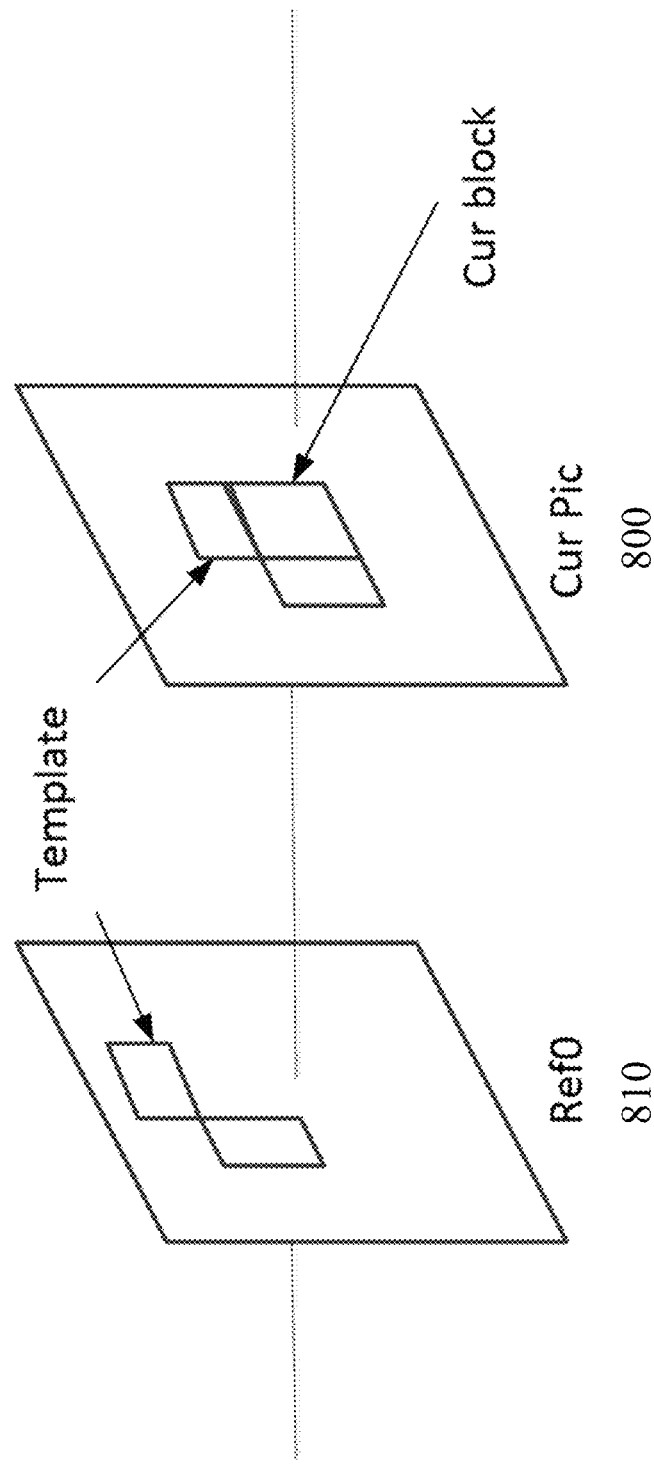
FIG. 8 shows an example of template matching in the FRUC algorithm.

FIG. 8 shows an example of template matching used in the Frame-Rate Up Conversion (FRUC) method. Template matching can be used to derive motion information of the current CU 800 by finding the closest match between a template (e.g., top and/or left neighboring blocks of the current CU) in the current picture and a block (e.g., same size to the template) in a reference picture 810. Except the aforementioned FRUC merge mode, the template matching can also be applied to AMVP mode. In both JEM and HEVC, AMVP has two candidates. With the template matching method, a new candidate can be derived. If the newly derived candidate by template matching is different to the first existing AMVP candidate, it is inserted at the very beginning of the AMVP candidate list and then the list size is set to two (e.g., by removing the second existing AMVP candidate). When applied to AMVP mode, only CU level search is applied.

The MV candidate set at CU level can include the following: (1) original AMVP candidates if the current CU is in AMVP mode, (2) all merge candidates, (3) several MVs in the interpolated MV field (described later), and/or (4) top and left neighboring motion vectors.

When using bilateral matching, each valid MV of a merge candidate can be used as an input to generate a MV pair with the assumption of bilateral matching. For example, one valid MV of a merge candidate is (MVa, $\text{ref}_a$) at reference list A. Then the reference picture $\text{ref}_b$ of its paired bilateral MV is found in the other reference list B so that $\text{ref}_a$ and $\text{ref}_b$ are temporally at different sides of the current picture. If such a $\text{ref}_b$ is not available in reference list B, $\text{ref}_b$ is determined as a reference which is different from $\text{ref}_a$ and its temporal distance to the current picture is the minimal one in list B. After $\text{ref}_b$ is determined, MVb is derived by scaling MVa based on the temporal distance between the current picture and $\text{ref}_a$, $\text{ref}_b$.

In some implementations, four MVs from the interpolated MV field can also be added to the CU level candidate list. More specifically, the interpolated MVs at the position (0, 0), (W/2, 0), (0, H/2) and (W/2, H/2) of the current CU are added. When FRUC is applied in AMVP mode, the original AMVP candidates are also added to CU level MV candidate set. In some implementations, at the CU level, 15 MVs for AMVP CUs and 13 MVs for merge CUs can be added to the candidate list.

The MV candidate set at sub-CU level includes an MV determined from a CU-level search, (2) top, left, top-left and top-right neighboring MVs, (3) scaled versions of collocated MVs from reference pictures, (4) one or more ATMVP candidates (e.g., up to four), and/or (5) one or more STMVP candidates (e.g., up to four). The scaled MVs from reference pictures are derived as follows. The reference pictures in both lists are traversed. The MVs at a collocated position of the sub-CU in a reference picture are scaled to the reference of the starting CU-level MV. ATMVP and STMVP candidates can be the four first ones. At the sub-CU level, one or more MVs (e.g., up to 17) are added to the candidate list.

Before coding a frame, interpolated motion field is generated for the whole picture based on unilateral ME. Then the motion field may be used later as CU level or sub-CU level MV candidates.

Figure 9:
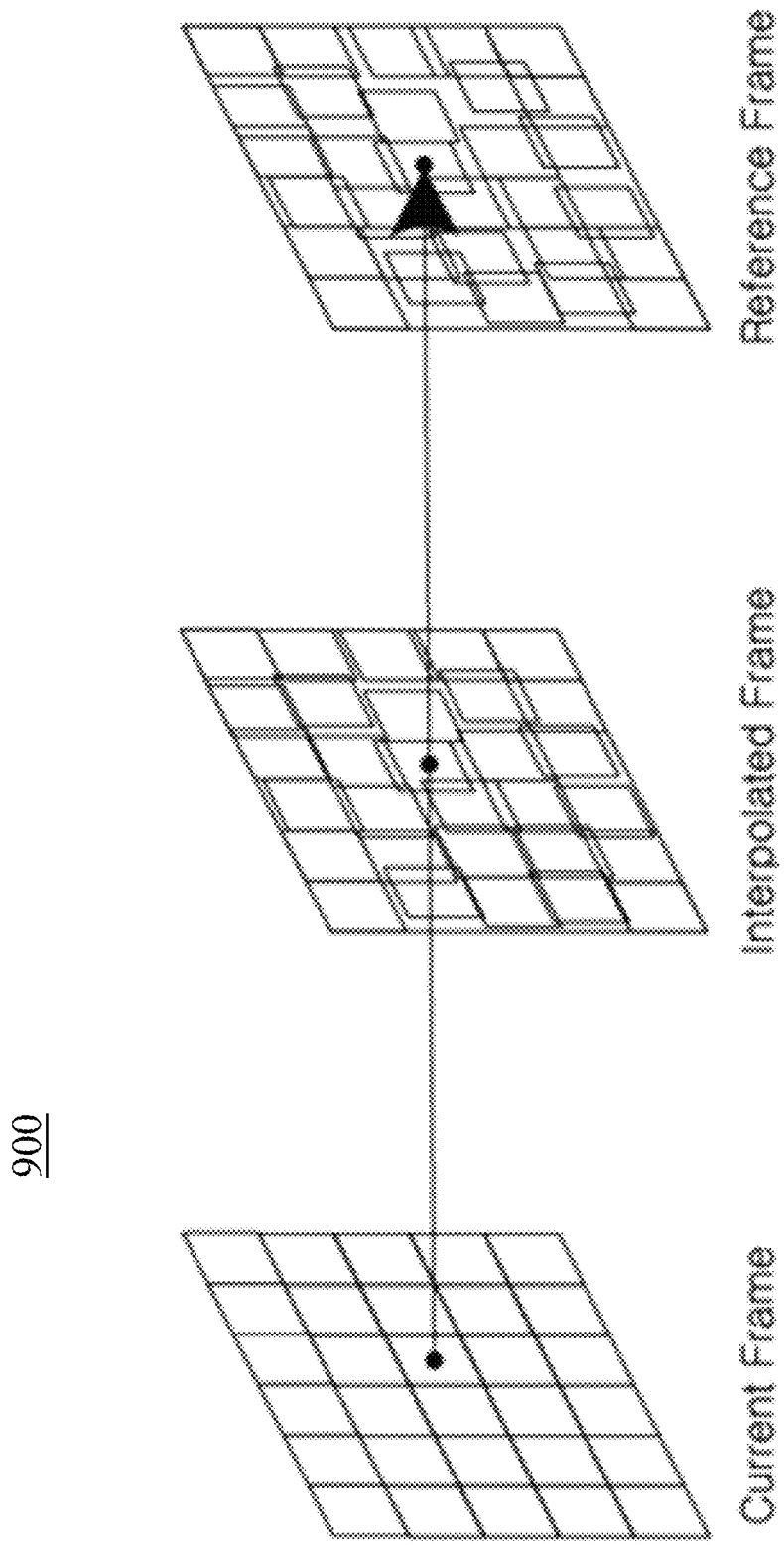
FIG. 9 shows an example of unilateral Motion Estimation (ME) in the FRUC method.

In some embodiments, the motion field of each reference pictures in both reference lists is traversed at 4×4 block level. FIG. 9 shows an example of unilateral Motion Estimation (ME) 900 in the FRUC method. For each 4×4 block, if the motion associated to the block passing through a 4×4 block in the current picture and the block has not been assigned any interpolated motion, the motion of the reference block is scaled to the current picture according to the temporal distance TD0 and TD1 (the same way as that of MV scaling of TMVP in HEVC) and the scaled motion is assigned to the block in the current frame. If no scaled MV is assigned to a 4×4 block, the block's motion is marked as unavailable in the interpolated motion field.

When a motion vector points to a fractional sample position, motion compensated interpolation is needed. To reduce complexity, bi-linear interpolation instead of regular 8-tap HEVC interpolation can be used for both bilateral matching and template matching.

The calculation of matching cost is a bit different at different steps. When selecting the candidate from the candidate set at the CU level, the matching cost can be the absolute sum difference (SAD) of bilateral matching or template matching. After the starting MV is determined, the matching cost C of bilateral matching at sub-CU level search is calculated as follows:

$$C=SAD+w \cdot (|MV_x-MV_x^s|+|MV_y-MV_y^s|) \quad \text{Eq. (4)}$$

Here, w is a weighting factor. In some embodiments, w can be empirically set to 4. MV and $MV^s$ indicate the current MV and the starting MV, respectively. SAD may still be used as the matching cost of template matching at sub-CU level search.

In FRUC mode, MV is derived by using luma samples only. The derived motion will be used for both luma and chroma for MC inter prediction. After MV is decided, final MC is performed using 8-taps interpolation filter for luma and 4-taps interpolation filter for chroma.

MV refinement is a pattern based MV search with the criterion of bilateral matching cost or template matching cost. In the JEM, two search patterns are supported—an unrestricted center-biased diamond search (UCBDS) and an adaptive cross search for MV refinement at the CU level and sub-CU level, respectively. For both CU and sub-CU level MV refinement, the MV is directly searched at quarter luma sample MV accuracy, and this is followed by one-eighth luma sample MV refinement. The search range of MV refinement for the CU and sub-CU step are set equal to 8 luma samples.

In the bilateral matching merge mode, bi-prediction is applied because the motion information of a CU is derived based on the closest match between two blocks along the motion trajectory of the current CU in two different reference pictures. In the template matching merge mode, the encoder can choose among uni-prediction from list0, uni-prediction from list1, or bi-prediction for a CU. The selection ca be based on a template matching cost as follows:

If costBi<=factor*min (cost0, cost1)
  bi-prediction is used;
Otherwise, if cost0<=cost1
  uni-prediction from list0 is used;
Otherwise,
  uni-prediction from list1 is used;

Here, cost0 is the SAD of list0 template matching, cost1 is the SAD of list1 template matching and costBi is the SAD of bi-prediction template matching. For example, when the value of factor is equal to 1.25, it means that the selection process is biased toward bi-prediction. The inter prediction direction selection can be applied to the CU-level template matching process.

Human visual system is less sensitive to the position and motion of color than luminance. Thus, bandwidth can be optimized by storing more luminance detail than color detail. In video systems, this is achieved by using color difference components. The signal is divided into a luma (Y') component and two color difference (chroma) components. Chroma subsampling is the practice of encoding images by implementing less resolution for chroma information than for luma information, taking advantage of the human visual system's lower acuity for color differences than for luminance. For example, common types of subsampling include 4:2:2 (the two chroma components are sampled at half the sample rate of luma), 4:1:1 (the horizontal color resolution is quartered), and 4:2:0 (the vertical resolution is halved as compared to 4:1:1 because the Cb and Cr channels are only sampled on each alternate line). In an example, the HEVC standard defines how to derive the MV used for MC in chroma components (noted as mvC) from the MV used for MC in the luma component (noted as mv). Generally speaking, mvC is calculated as mv multiplying a factor, which relies on the color format, such as 4:2:0 or 4:2:2.

Intra block copy (IBC, or intra picture block compensation), also named current picture referencing (CPR) was adopted in HEVC screen content coding extensions (SCC). This tool is very efficient for coding of screen content video in that repeated patterns in text and graphics rich content occur frequently within the same picture. Having a previously reconstructed block with equal or similar pattern as a predictor can effectively reduce the prediction error and therefore improve coding efficiency.

Similar to the design of CRP in HEVC SCC, In VVC, the use of the IBC mode is signaled at both sequence and picture level. When the IBC mode is enabled at sequence parameter set (SPS), it can be enabled at picture level. When the IBC mode is enabled at picture level, the current reconstructed picture is treated as a reference picture. Therefore, no syntax change on block level is needed on top of the existing VVC inter mode to signal the use of the IBC mode.

Features of IBC mode include the following:

- It is treated as a normal inter mode. Therefore, merge and skip modes are also available for the IBC mode. The merge candidate list construction is unified, containing merge candidates from the neighboring positions that are either coded in the IBC mode or the HEVC inter mode. Depending on the selected merge index, the current block under merge or skip mode can merge into either an IBC mode coded neighbor or otherwise an normal inter mode coded one with different pictures as reference pictures.
- Block vector prediction and coding schemes for the IBC mode reuse the schemes used for motion vector prediction and coding in the HEVC inter mode (AMVP and MVD coding).
- The motion vector for the IBC mode, also referred as block vector, is coded with integer-pel precision, but stored in memory in 1/16-pel precision after decoding as quarter-pel precision is required in interpolation and deblocking stages. When used in motion vector prediction for the IBC mode, the stored vector predictor will be right shifted by 4.

Search range: it is restricted to be within the current CTU. CPR is disallowed when affine mode/triangular mode/GBI/weighted prediction is enabled.

In some cases, pairwise average candidates are generated by averaging predefined pairs of candidates in the current merge candidate list, and the predefined pairs are defined as $\{(0, 1), (0, 2), (1, 2), (0, 3), (1, 3), (2, 3)\}$, where the numbers denote the merge indices to the merge candidate list. The averaged motion vectors are calculated separately for each reference list. If both motion vectors are available in one list, these two motion vectors are averaged even when they point to different reference pictures; if only one motion vector is available, use the one directly; if no motion vector is available, keep this list invalid. The pairwise average candidates replaces the combined candidates in HEVC standard. Suppose the MVs of two merge candidates are $MV_0=(MV_{0x}, MV_{0y})$ and $MV_1=(MV_{1x}, MV_{1y})$, then the MV of the pairwise merge candidate denoted as $MV^*=(MV^*_x, MV^*_y)$ is derived as $$MV^*_x=(MV_{0x}+MV_{1x})/2, \text{ and}$$

$$MV^*_y=(MV_{0y}+MV_{1y})/2.$$

In addition, when $MV_0$ and $MV_1$ refer to the current picture (i.e., CPR mode), $MV^*_x$ and $MV^*_y$ are further rounded to remove the part with a higher precision than full pixel to make sure the integer MV is obtained:

$$MV^*_x=(MV^*_x/16)<<4, \text{ and}$$

$$MV^*_y=(MV^*_y/16)<<4.$$

It is noted that for each pair, if one of the two is coded with CPR and the other is not, such pair is disallowed to generate the pairwise average candidate.

The concept of the triangular prediction mode (TPM) is to introduce a new triangular partition for motion compensated prediction. It splits a CU into two triangular prediction units, in either diagonal or inverse diagonal direction. Each triangular prediction unit in the CU is inter-predicted using its own uni-prediction motion vector and reference frame index which are derived from a single uni-prediction candidate list. An adaptive weighting process is performed to the diagonal edge after predicting the triangular prediction units. Then, the transform and quantization process are applied to the whole CU. It is noted that this mode is only applied to merge mode (note: skip mode is treated as a special merge mode). Uni-prediction candidate list for TPM.

The uni-prediction candidate list, named TPM motion candidate list, consists of five uni-prediction motion vector candidates. It is derived from seven neighboring blocks including five spatial neighboring blocks and two temporal co-located blocks. The motion vectors of the seven neighboring blocks are collected and put into the uni-prediction candidate list according in the order of uni-prediction motion vectors, L0 motion vector of bi-prediction motion vectors, L1 motion vector of bi-prediction motion vectors, and averaged motion vector of the L0 and L1 motion vectors of bi-prediction motion vectors. If the number of candidates is less than five, zero motion vector is added to the list. Motion candidates added in this list for TPM are called TPM candidates, motion information derived from spatial/temporal blocks are called regular motion candidates.

More specifically, the following steps are involved:

(1) Obtain regular motion candidates from A1, B1, B0, A0, B2, Col and Col2 (similar as those in the regular merge mode) without any pruning operations.

(2) Set variable numCurrMergeCand=0

(3) For each regular motion candidates derived from A1, B1, B0, A0, B2, Col and Col2 and numCurrMergeCand is less than 5, if the regular motion candidate is uni-prediction (either from List 0 or List 1), it is directly added to the merge list as an TPM candidate with numCurrMergeCand increased by 1. Such a TPM candidate is named "originally uni-predicted candidate".

Full pruning is applied.

(4) For each motion candidates derived from A1, B1, B0, A0, B2, Col and Col2 and numCurrMergeCand is less than 5, if the regular motion candidate is bi-prediction, the motion information from List 0 is added to the TPM merge list (that is, modified to be uni-prediction from List 0) as a new TPM candidate and numCurrMergeCand increased by 1. Such a TPM candidate is named 'Truncated List0-predicted candidate'.

Full pruning is applied.

(5) For each motion candidates derived from A1, B1, B0, A0, B2, Col and Col2 and numCurrMergeCand is less than 5, if the regular motion candidate is bi-prediction, the motion information from List 1 is added to the TPM merge list (that is, modified to be uni-prediction from List 1) and numCurrMergeCand increased by 1. Such a TPM candidate is named 'Truncated List1-predicted candidate'.

Full pruning is applied.

(6) For each motion candidates derived from A1, B1, B0, A0, B2, Col and Col2 and numCurrMergeCand is less than 5, if the regular motion candidate is bi-prediction, the motion information of List 1 is firstly scaled to List 0 reference picture, and the average of the two MVs (one is from original List 0, and the other is the scaled MV from List 1) is added to the TPM merge list, such a candidate is called averaged uni-prediction from List 0 motion candidate and numCurrMergeCand increased by 1.

Full pruning is applied.

(7) If numCurrMergeCand is less than 5, zero motion vector candidates are added.

When inserting a candidate to the list, if it has to be compared to all previously added candidates to see whether it is identical to one of them, such a process is called full pruning.

Assume the scaled MV denoted by $(MV_{1'x}, MV_{1'y})$ and the List 0 MV by $(MV_{0x}, MV_{0y})$. The averaged uni-prediction from List 0 motion candidate denoted by $(MV^*_x, MV^*_y)$ is defined as:

$$MV^*_x=(MV_{0x}+MV_{1'x}+1)>>1, \text{ and}$$

$$MV^*_y=(MV_{0y}+MV_{1'y}+1)>>1.$$

In some existing implementations, such as the affine prediction in JEM, MVs of each sub-block are calculated with the affine model as shown in Eq. (1) independently for each component, which may result in misalignment of motion vectors between luma and chroma components. Multiple calculations for the components also result in coding inefficiency. In some other existing implementations, the motion vector averaging operation to derive the pairwise merge candidate/averaged uni-prediction from List 0 motion candidate need to be aligned with the rounding method used in the sub-block prediction. It is thus desirable to obtain a unified design.

This patent document discloses techniques that can be implemented in various embodiments to calculate the MV of a sub-block of one component (e.g., a chroma component) from MV(s) of one or more sub-blocks of another component (e.g., a luma component). The disclosed techniques eliminate the need to determining MV(s) of different components multiple times, thereby improving video coding efficiency. The disclosed techniques also introduce a unified design with respect to the averaging operation and the round method.

The use of such techniques is elucidated in the following examples described for various implementations. In the following examples, which should not be construed to be limiting, Shift (x, s) is defined as Shift(x, s)=(x+off)>>s, and SignShift (x, s) is defined as:

$$SignShift(x, s) = \begin{cases} (x + \text{off}) >> s & x \geq 0 \\ -((-x + \text{off}) >> s) & x < 0 \end{cases}.$$

Herein, off is an integer, e.g. 0 or 1<<(s−1).

In some embodiments, the MV of a sub-block of one component can be derived based on the MV(s) of one or more sub-blocks of another component. Here, the MV(s) of one or more sub-blocks of another component has (have) already been derived with the affine model. This way, there is no need to derive motion information multiple times.

Figure 10:
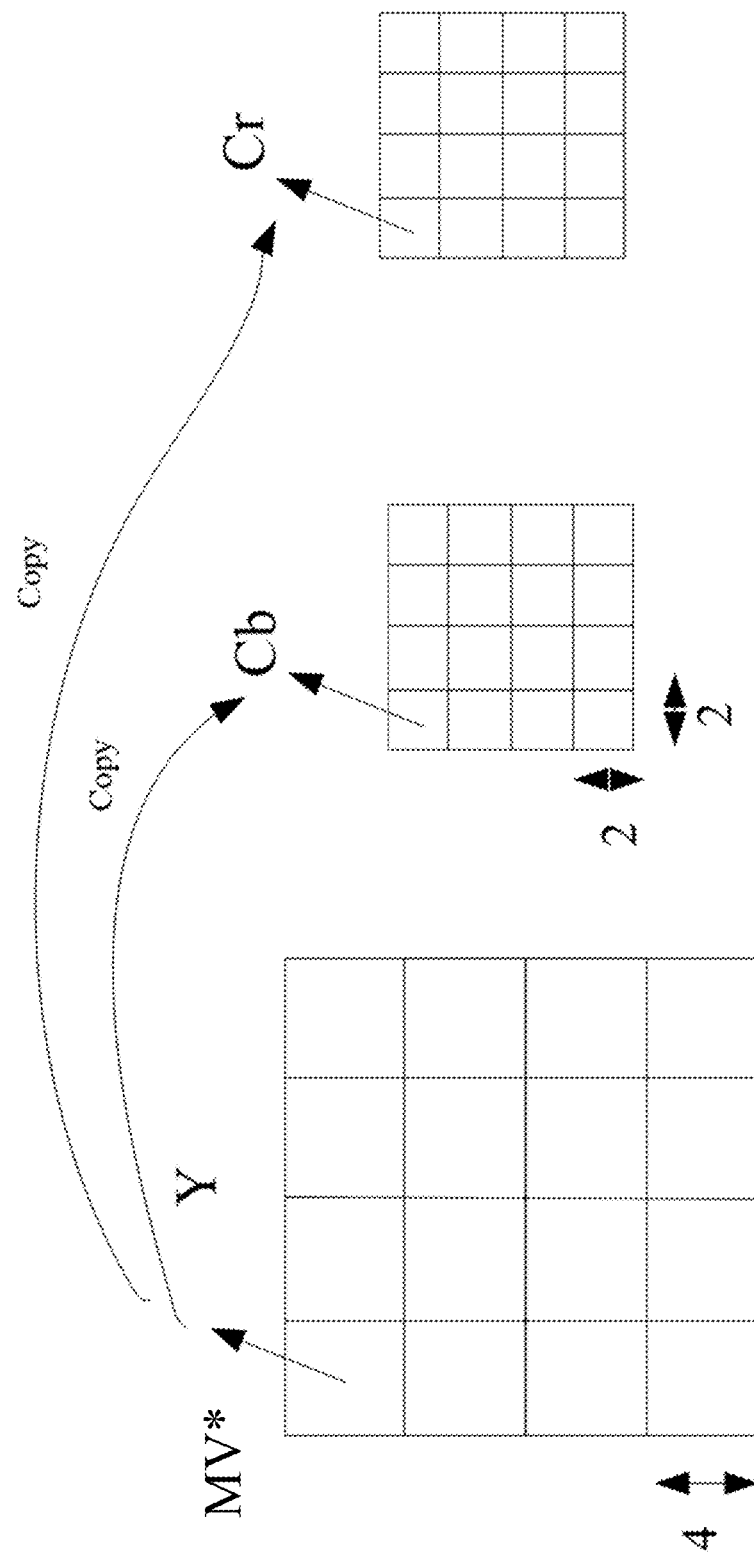
FIG. 10 shows an example of deriving a motion vector (MV) of a component for sub-blocks in the 4:2:0 format in accordance with the present technology.

In some embodiments, the HEVC standard defines how to derive the MV in chroma components (noted as mvC) from the MV used for MC in the luma component (noted as mv). Generally speaking, mvC is calculated as mv multiplying a factor, which relies on the color format, such as 4:2:0 or 4:2:2. FIG. 10 shows an example of deriving an MV of a component for sub-blocks in the 4:2:0 format in accordance with the present technology. In this example, the block size is 16×16 for Y (luma component) and 8×8 for Cb/Cr (chroma components). The sub-block size of the luma component is 4×4, while the sub-block size of the chroma components is 2×2. A MV* is first derived for a 4×4 sub-block in the Y component. The MVs of the 2×2 sub-block in the Cb and/or Cr components can be derived based on MV*. In this specific example, the value of MV* is copied first, and the MV(s) of the 2×2 sub-block in the Cb and/or Cr component(s) are calculated based on MV* according to the HEVC standard.

Figure 11:
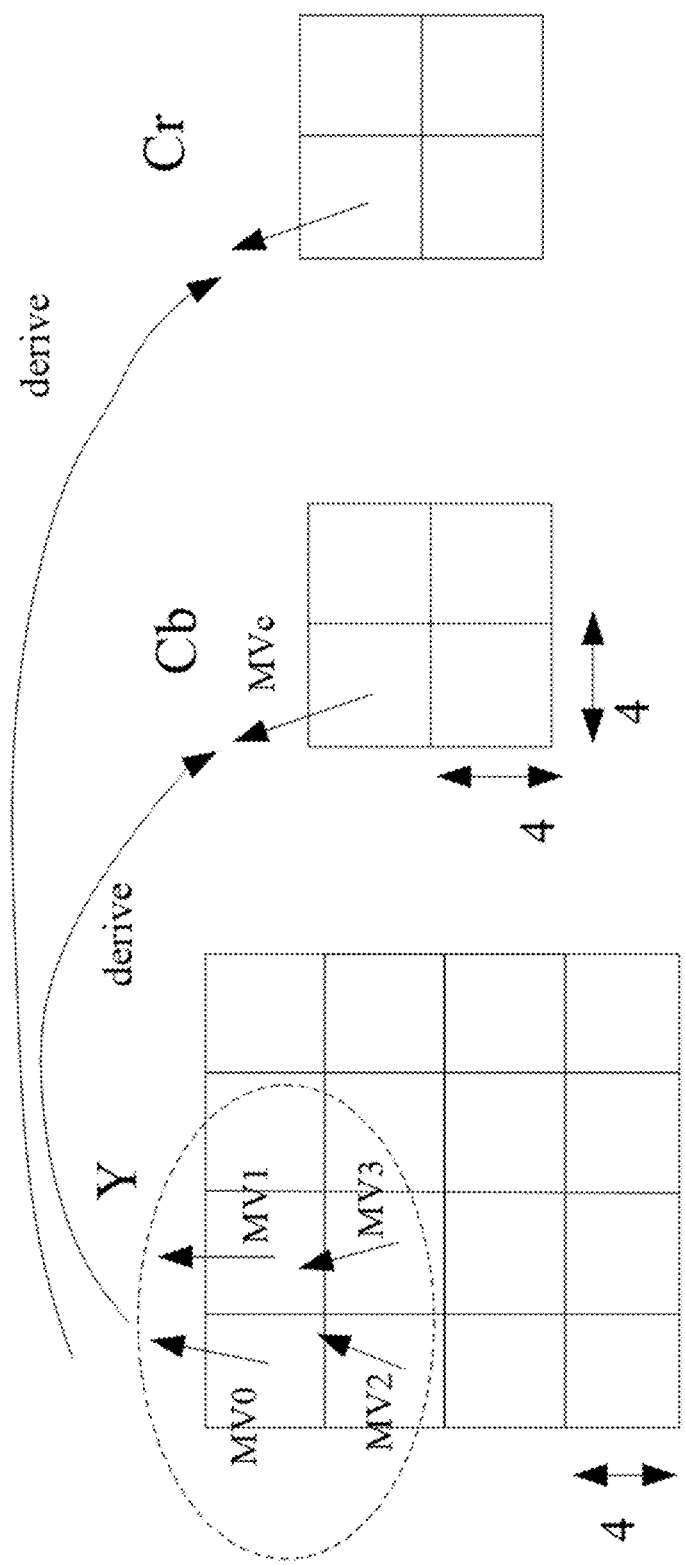
FIG. 11 shows another example of deriving an MV of a component for sub-blocks in the 4:2:0 format in accordance with the present technology.

FIG. 11 shows another example of deriving an MV of a component for sub-blocks in the 4:2:0 format in accordance with the present technology. In this example, the block size is 16×16 for the luma component and 8×8 for a chroma component. The sub-block size of all the components is 4×4. A 4×4 sub-block in the Cb or Cr component corresponds to four 4×4 sub-block in the Y component. A MV* for the luma component is first calculated. The MV of the 4×4 sub-block in the Cb or Cr component is then derived based on MV* according to the HEVC standard.

In some embodiments, MV* is calculated as the average of all corresponding sub-block MVs in the Y component: MV*=(MV$_0$+MV$_1$+MV$_2$+MV$_3$)/4. Suppose MV*=(MV*$_x$, MV*$_y$), MV$_0$=(MV$_{0x}$, MV$_{0y}$), MV$_1$=(MV$_{1x}$, MV$_{1y}$), MV$_2$=(MV$_{2x}$, MV$_{2y}$) and MV$_3$=(MV$_{3x}$, MV$_{3y}$).

In some embodiments, MV*$_x$=Shift (MV$_{0x}$+MV$_{1x}$+MV$_{2x}$+MV$_{3x}$, 2), MV*$_y$=Shift (MV$_{0y}$+MV$_{1y}$+MV$_{2y}$+MV$_{3y}$, 2). In some embodiments, MV*$_x$=SignShift (MV$_{0x}$+MV$_{1x}$+MV$_{2x}$+MV$_{3x}$, 2), MV*$_y$=SignShift (MV$_{0y}$+MV$_{1y}$+MV$_{2y}$+MV$_{3y}$, 2).

In some embodiments, the calculation of MV* can be performed using the following operations:
1.a MV'$_x$=Shift (MV$_{0x}$+MV$_{1x}$, 1),
1.b MV'$_y$=Shift (MV$_{0y}$+MV$_{1y}$, 1),
1.c MV''$_x$=Shift (MV$_{2x}$+MV$_{3x}$, 1),
1.d MV''$_y$=Shift (MV$_{2y}$+MV$_{3y}$, 1),
1.e MV*$_x$=Shift (MV'$_x$+MV''$_x$, 1), and
1.f MV*$_y$=Shift (MV'$_y$+MV''$_y$, 1).

In some embodiments, the calculation of MV* can be performed using the following operations:
2.a MV'$_x$=Shift (MV$_{0x}$+MV$_{2x}$, 1),
2.b MV'$_y$=Shift (MV$_{0y}$+MV$_{2y}$, 1),
2.c MV''$_x$=Shift (MV$_{1x}$+MV$_{3x}$, 1),
2.d MV''$_y$=Shift (MV$_{1y}$+MV$_{3y}$, 1),
2.e MV*$_x$=Shift (MV'$_x$+MV''$_x$, 1), and
2.f MV*$_y$=Shift (MV'$_y$+MV''$_y$, 1).

In some embodiments, the calculation of MV* can be performed using the following operations:
3.a MV'$_x$=SignShift (MV$_{0x}$+MV$_{1x}$, 1),
3.b MV'$_y$=SignShift (MV$_{0y}$+MV$_{1y}$, 1),
3.c MV''$_x$=SignShift (MV$_{2x}$+MV$_{3x}$, 1),
3.d MV''$_y$=SignShift (MV$_{2y}$+MV$_{3y}$, 1),
3.e MV*$_x$=SignShift (MV'$_x$+MV''$_x$, 1), and
3.f MV*$_y$=SignShift (MV'$_y$+MV''$_y$, 1).

In some embodiments, the calculation of MV* can be performed using the following operations:
4.a MV'$_x$=SignShift (MV$_{0x}$+MV$_{2x}$, 1),
4.b MV'$_y$=SignShift (MV$_{0y}$+MV$_{2y}$, 1),
4.c MV''$_x$=SignShift (MV$_{1x}$+MV$_{3x}$, 1),
4.d MV''$_y$=SignShift (MV$_{1y}$+MV$_{3y}$, 1),
4.e MV*$_x$=SignShift (MV'$_x$+MV''$_x$, 1), and
4.f MV*$_y$=SignShift (MV'$_y$+MV''$_y$, 1).

In some embodiments, MV* is calculated based on the MV of top-left sub-block in the Y component (e.g., MV$_0$ as shown in FIG. 11). In some embodiments, MV* is calculated based on the MV of center sub-block in the Y component. In some embodiments, MV* is calculated based on the median MVs of all corresponding sub-blocks in the Y component. In this specific example shown in FIG. 11, MV*=median (MV$_0$, MV$_1$, MV$_2$, MV$_3$).

In some embodiments, the derivation of MVs of sub-blocks for color components can be determined based on the color format, such as 4:2:0, 4:2:2 and/or 4:4:4. For example, when the color format is 4:4:4, no subsampling occurs. The sub-block sizes and the number of sub-blocks in a block of video data are the same for all components. The MV of a sub-block in one component is the same as the MV of a corresponding sub-block in another component.

As another example, when the color format is 4:2:2. the sub-block sizes can be the same for all components, while the number of blocks can be different for different components. A MV* for the luma component is first calculated based on the MVs of several corresponding sub-blocks. The MV(s) of the corresponding sub-block in the Cb or Cr component is then derived from MV*.

Figure 12:
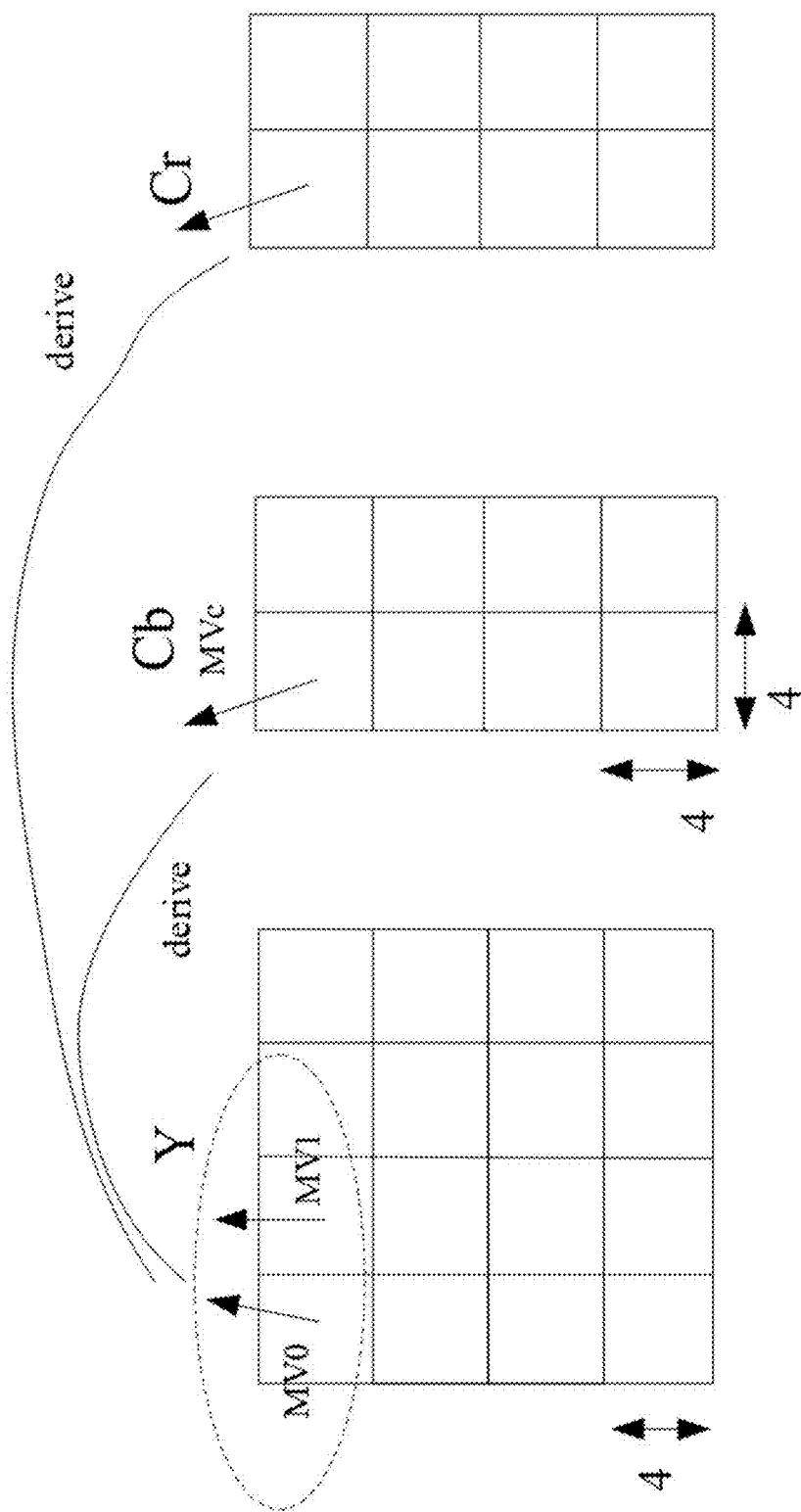
FIG. 12 shows yet another example of deriving an MV of a component for sub-blocks in accordance with the present technology.

FIG. 12 shows yet another example of deriving an MV of a component for sub-blocks in accordance with the present technology. In this example, the block size is 16×16 for the luma component and 8×16 for the chroma components. The sub-block size of all the components is 4×4. A 4×4 sub-block in the Cb or Cr component corresponds to two 4×4 sub-block in the Y component. A MV* for the luma component is first calculated. The MV of the 4×4 sub-block in the Cb or Cr component is then derived based on MV* according to the HEVC standard.

In some embodiments, MV* is calculated as the average of all corresponding sub-block MVs in the Y component:

MV*=(MV$_0$+MV$_1$)/2. Suppose MV*=(MV*$_x$, MV*$_y$), MV$_0$=(MV$_{0x}$, MV$_{0y}$), MV$_1$=(MV$_{1x}$, MV$_{1y}$), In some embodiments, MV*$_x$=Shift (MV$_{0x}$+MV$_{1x}$, 1), MV*$_y$=Shift (MV$_{0y}$+MV$_{1y}$, 1). In some embodiments, MV*$_x$=SignShift (MV$_{0x}$+MV$_{1x}$, 1), MV*$_y$=SignShift (MV$_{0y}$+MV$_{1y}$, 1).

Figure 13:
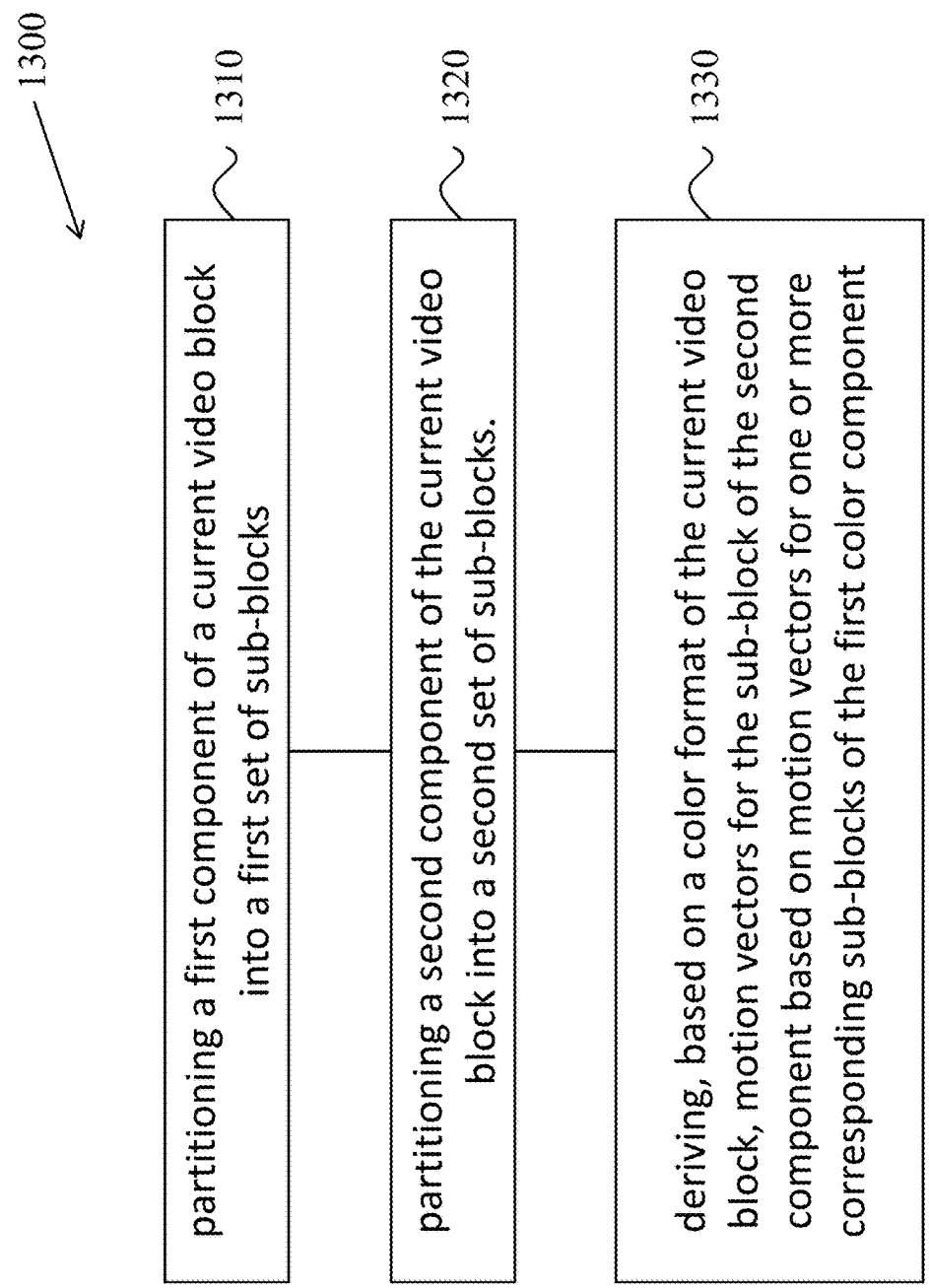
FIG. 13 is a flowchart of an example method for video encoding in accordance with one or more embodiments of the present technology.

FIG. 13 is a flowchart of an example method 1300 for video encoding in accordance with one or more embodiments of the present technology. The method 1300 includes, at operation 1310, partitioning a first component of a current video block into a first set of sub-blocks. The method 1300 includes, at operation 1320, partitioning a second component of the current video block into a second set of sub-blocks. A sub-block of the second component corresponds to one or more sub-blocks of the first component. The method 1300 also includes, at operation 1330, deriving, based on a color format of the current video block, motion vectors for a sub-block of the second component based on motion vectors for one or more corresponding sub-blocks of the first color component.

Figure 14:
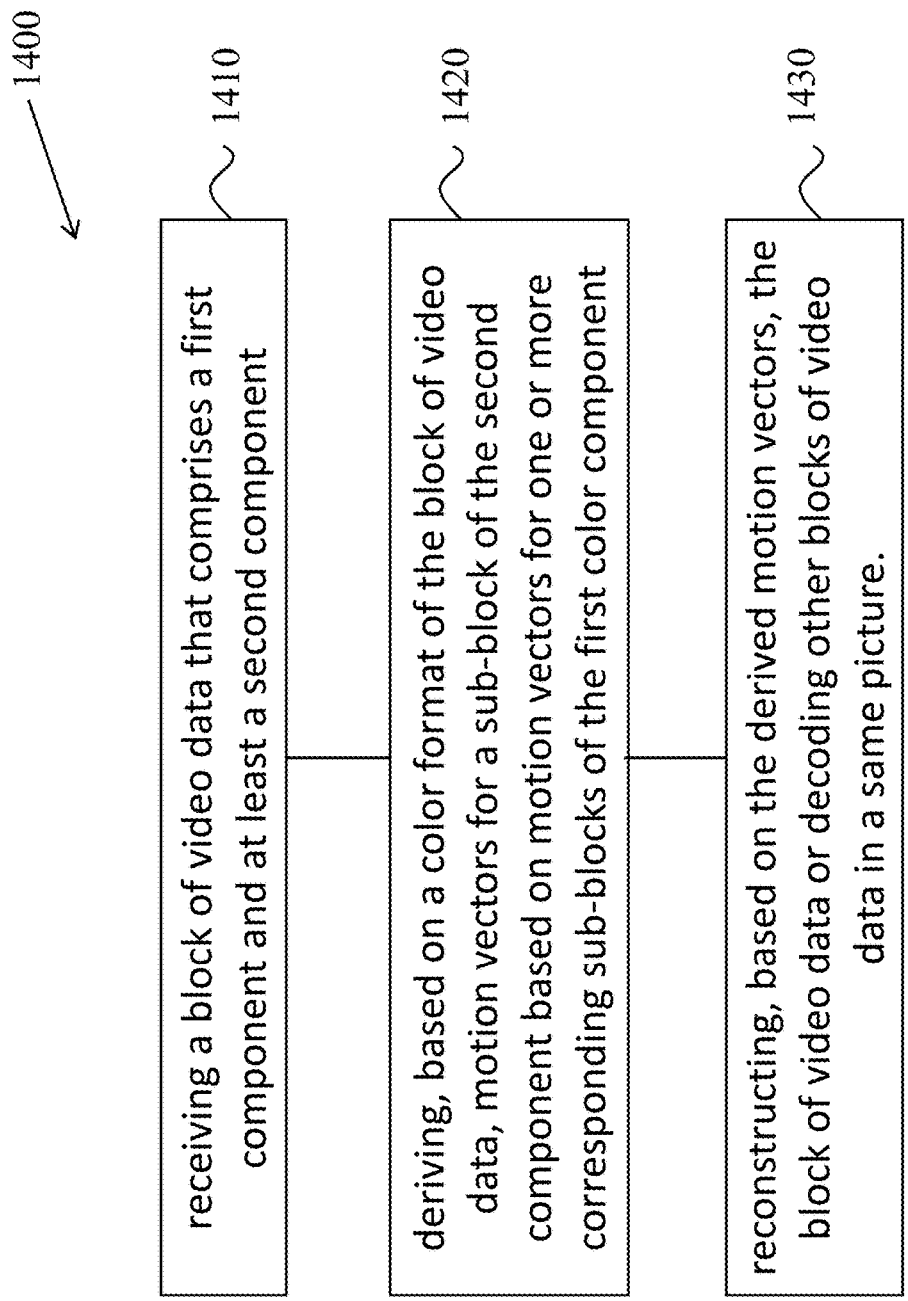
FIG. 14 is a flowchart of another example method for video encoding in accordance with one or more embodiments of the present technology.

FIG. 14 is a flowchart of another example method 1400 for video encoding in accordance with one or more embodiments of the present technology. The method 1400 includes, at operation 1410, receiving a block of video data that comprises a first component and at least a second component. The first component is partitioned into a first set of sub-blocks and the second component is partitioned into a second set of sub-blocks. A sub-block of the second component corresponds to one or more sub-blocks of the first component. The method 1400 includes, at operation 1420, deriving, based on a color format of the block of video data, motion vectors for a sub-block of the second component based on motion vectors for one or more corresponding sub-blocks of the first color component. The method 1400 includes, at operation 1430, reconstructing, based on the derived motion vectors, the block of video data or decoding other blocks of video data in a same picture.

In some embodiments, the sub-block of the second component corresponds to a sub-block of the first component. For example, these two sub-blocks may be spatially co-located in the picture. The method 1300 or 1400 further includes calculating an intermediate set of motion vectors by copying motion vectors of the sub-block of the first component and applying a factor to the intermediate set of motion vectors to obtain the derived motion vectors, wherein the factor is associated with the color format.

In some embodiments, the color format is not 4:4:4 (e.g., is 4:2:2, or 4:2:0) and the size of at least one of the first set of sub-blocks is different than the size of at least one of the second set sub-blocks. In some embodiments, the color format is 4:4:4 and the size of at least one of the first set of sub-blocks is same as the size of at least one of the second set sub-blocks.

In some embodiments, the color format is not 4:4:4 and a size of at least one of the first set of sub-blocks is same as a size of at least one of the second set sub-blocks. A sub-block of the second component corresponds to multiple sub-blocks of the first component. In some embodiments, at least one of the motion vectors for a sub-block of the second component is derived based on an average of corresponding motion vectors of the multiple sub-blocks of the first component.

In some implementations, the sub-block of the second component corresponds to four sub-blocks of the first component. The four sub-blocks have motion vectors MV$_0$=(MV$_{0x}$, MV$_{0y}$), MV$_1$=(MV$_{1x}$, MV$_{1y}$), MV$_2$=(MV$_{2x}$, MV$_{2y}$) and MV$_3$=(MV$_{3x}$, MV$_{3y}$) respectively. The method 1300 or 1400 includes calculating an intermediate set of motion vectors MV*=(MV*x, MV*y) as MV*x=Shift(MV0x+MV1x+MV2x+MV3x, 2) and MV*y=Shift(MVy0+MVy1+MVy2+MVy3,2), wherein Shift(x, s)=(x+off)>>s, wherein off and s are integers, and wherein >> represents a right shift operation. The method 1300 or 1400 also includes applying a factor to the intermediate set of motion vectors to obtain the derived motion vectors, wherein the factor is associated with the color format.

In some implementations, the sub-block of the second component corresponds to four sub-blocks of the first component. The four sub-blocks have motion vectors MV$_0$=(MV$_{0x}$, MV$_{0y}$), MV$_1$=(MV$_{1x}$, MV$_{1y}$), MV$_2$=(MV$_{2x}$, MV$_{2y}$) and MV$_3$=(MV$_{3x}$, MV$_{3y}$) respectively. The method 1300 or 1400 comprises calculating an intermediate set of motion vectors MV*=(MV*x, MV*y) as MV*x=SignShift(MV0x+MV1x+MV2x+MV3x, 2) and MV*y=SignShift(MV0y+MV1y+MV2y+MV3y, 2), wherein $$SignShift(x, s) = \begin{cases} (x+\text{off}) >> s & x \geq 0 \\ -((-x+\text{off}) >> s) & x < 0 \end{cases},$$

wherein off and s are integers, and wherein >> represents a shift operation. The method 1300 or 1400 also includes applying a factor to the intermediate set of motion vectors to obtain the derived motion vectors, wherein the factor is associated with the color format.

In some implementations, the sub-block of the second component corresponds to four sub-blocks of the first component. The four sub-blocks have motion vectors MV$_0$=(MV$_{0x}$, MV$_{0y}$), MV$_1$=(MV$_{1x}$, MV$_{1y}$), MV$_2$=(MV$_{2x}$, MV$_{2y}$) and MV$_3$=(MV$_{3x}$, MV$_{3y}$) respectively. The method 1300 or 1400 includes calculating an intermediate set of motion vectors MV*=(MV*x, MV*y) as MV*x=Shift(MV'x+MV"x, 1) and MV*y=Shift(MV'y+MV"y, 1), wherein MV'x=Shift(MV0x+MV1x, 1), MV'y=Shift(MV0y+MV1y, 1), MV"x=Shift(MV2x+MV3x,1), and MV"y=Shift (MV2y+MV3y, 1), wherein Shift(x,s)=(x+off)>>s, wherein off and s are integers, and wherein >> represents a right shift operation. The method 1300 or 1400 also includes applying a factor to the intermediate set of motion vectors to obtain the derived motion vectors, wherein the factor is associated with the color format.

In some implementations, the sub-block of the second component corresponds to four sub-blocks of the first component. The four sub-blocks have motion vectors MV$_0$=(MV$_{0x}$, MV$_{0y}$), MV$_1$=(MV$_{1x}$, MV$_{1y}$), MV$_2$=(MV$_{2x}$, MV$_{2y}$) and MV$_3$=(MV$_{3x}$, MV$_{3y}$) respectively. The method 1300 or 1400 includes calculating an intermediate set of motion vectors MV*=(MV*x, MV*y) as MV*x=Shift(MV'x+MV"x, 1) and MV*y=Shift(MV'y+MV"y,1), wherein MV'x=Shift(MV0x+MV2x, 1), MV'y=Shift(MV0y+MV2y, 1), MV"x=Shift(MV1x+MV3x,1), and MV"y=Shift (MV1y+MV3y,1), wherein Shift(x, s)=(x+off)>>s, wherein off and s are integers, and wherein >> represents a right shift operation. The method 1300 or 1400 also includes applying a factor to the intermediate set of motion vectors to obtain the derived motion vectors, wherein the factor is associated with the color format.

In some implementations, the sub-block of the second component corresponds to four sub-blocks of the first component. The four sub-blocks have motion vectors MV$_0$=(MV$_{0x}$, MV$_{0y}$), MV$_1$=(MV$_{1x}$, MV$_{1y}$), MV$_2$=(MV$_{2x}$, MV$_{2y}$) and MV$_3$=(MV$_{3x}$, MV$_{3y}$) respectively. The method 1300 or 1400 includes calculating an intermediate set of motion vectors MV*=(MV*x, MV*y) as MV*x=SignShift(MV'x+MV"x, 1) and MV*y=SignShift(MV'y+MV"y, 1), wherein MV'x=SignShift(MV0x+MV1x,1), MV'y=SignShift(MV0y+MV1y, 1), MV"x=SignShift(MV2x+MV3x, 1), and MV"y=SignShift(MV2y+MV3y, 1), wherein $$SignShift(x, s) = \begin{cases} (x + \text{off}) >> s & x \geq 0 \\ -((-x + \text{off}) >> s) & x < 0 \end{cases},$$

wherein off and s are integers, and wherein >> represents a shift operation. The method 1300 or 1400 also includes applying a factor to the intermediate set of motion vectors to obtain the derived motion vectors, wherein the factor is associated with the color format.

In some implementations, the sub-block of the second component corresponds to four sub-blocks of the first component. The four sub-blocks have motion vectors $MV_0=(MV_{0x}, MV_{0y})$, $MV_1=(MV_{1x}, MV_{1y})$, $MV_2=(MV_{2x}, MV_{2y})$ and $MV_3=(MV_{3x}, MV_{3y})$ respectively. The method 1300 or 1400 includes calculating an intermediate set of motion vectors MV*=(MV*x, MV*y) as MV*x=SignShift(MV'x+MV"x, 1) and MV*y=SignShift(MV'y+MV"y, 1), wherein MV'x=SignShift(MV0x+MV2x,1), MV'y=SignShift(MV0y+MV2y, 1), MV"x=SignShift(MV1x+MV3x, 1), and MV"y=SignShift(MV1y+MV3y, 1), wherein $$SignShift(x, s) = \begin{cases} (x + \text{off}) >> s & x \geq 0 \\ -((-x + \text{off}) >> s) & x < 0 \end{cases},$$

wherein off and s are integers, and wherein >> represents a shift operation. The method 1300 or 1400 also includes applying a factor to the intermediate set of motion vectors to obtain the derived motion vectors, wherein the factor is associated with the color format.

In some implementations, the sub-block of the second component corresponds to two sub-blocks of the first component. The two sub-blocks have motion vectors $MV_0=(MV_{0x}, MV_{0y})$ and $MV_1=(MV_{1x}, MV_{1y})$ respectively. The method 1300 or 1400 includes calculating an intermediate set of motion vectors MV*=(MV*x, MV*y) as MV*x=Shift(MV0x+MV1x, 1) and MV*y=Shift(MVy0+MVy1,1), wherein Shift(x, s)=(x+off)>>s, wherein off and s are integers, and wherein >> represents a right shift operation. The method 1300 or 1400 also includes applying a factor to the intermediate set of motion vectors to obtain the derived motion vectors, wherein the factor is associated with the color format.

In some implementations, the sub-block of the second component corresponds to two sub-blocks of the first component. The two sub-blocks have motion vectors $MV_0=(MV_{0x}, MV_{0y})$ and $MV_1=(MV_{1x}, MV_{1y})$ respectively. The method 1300 or 1400 includes calculating an intermediate set of motion vectors MV*=(MV*x, MV*y) as MV*x=SignShift(MV0x+MV1x, 1) and MV*y=SignShift(MVy0+MVy1,1), wherein $$SignShift(x, s) = \begin{cases} (x + \text{off}) >> s & x \geq 0 \\ -((-x + \text{off}) >> s) & x < 0 \end{cases},$$

wherein off and s are integers, and wherein >> represents a shift operation. The method 1300 or 1400 also includes applying a factor to the intermediate set of motion vectors to obtain the derived motion vectors, wherein the factor is associated with the color format.

In some embodiments, the method 1300 or 1400 further comprises calculating an intermediate set of motion vectors based on motion vectors of a selected sub-block among the multiple sub-blocks of the first component and applying a factor to the intermediate set of motion vectors to obtain the derived motion vectors. The factor is associated with the color format. In some implementations, the selected sub-block is a top-left sub-block of the multiple sub-blocks of the first component. In some implementations, the selected sub-block is a center sub-block of the multiple sub-blocks of the first component.

In some embodiments, the method 1300 or 1400 includes calculating an intermediate set of motion vectors based on a median of motion vectors of the multiple sub-blocks of the first component and applying a factor to the intermediate set of motion vectors to obtain the derived motion vectors, wherein the factor is associated with the color format.

In some embodiments, the applying of the factor is specified in a High Efficiency Video Coding (HEVC) standard.

The examples described above may be incorporated in the context of the methods described below, e.g., methods 1300 and 1400, which may be implemented at a video decoder and/or video encoder.

Figure 15:
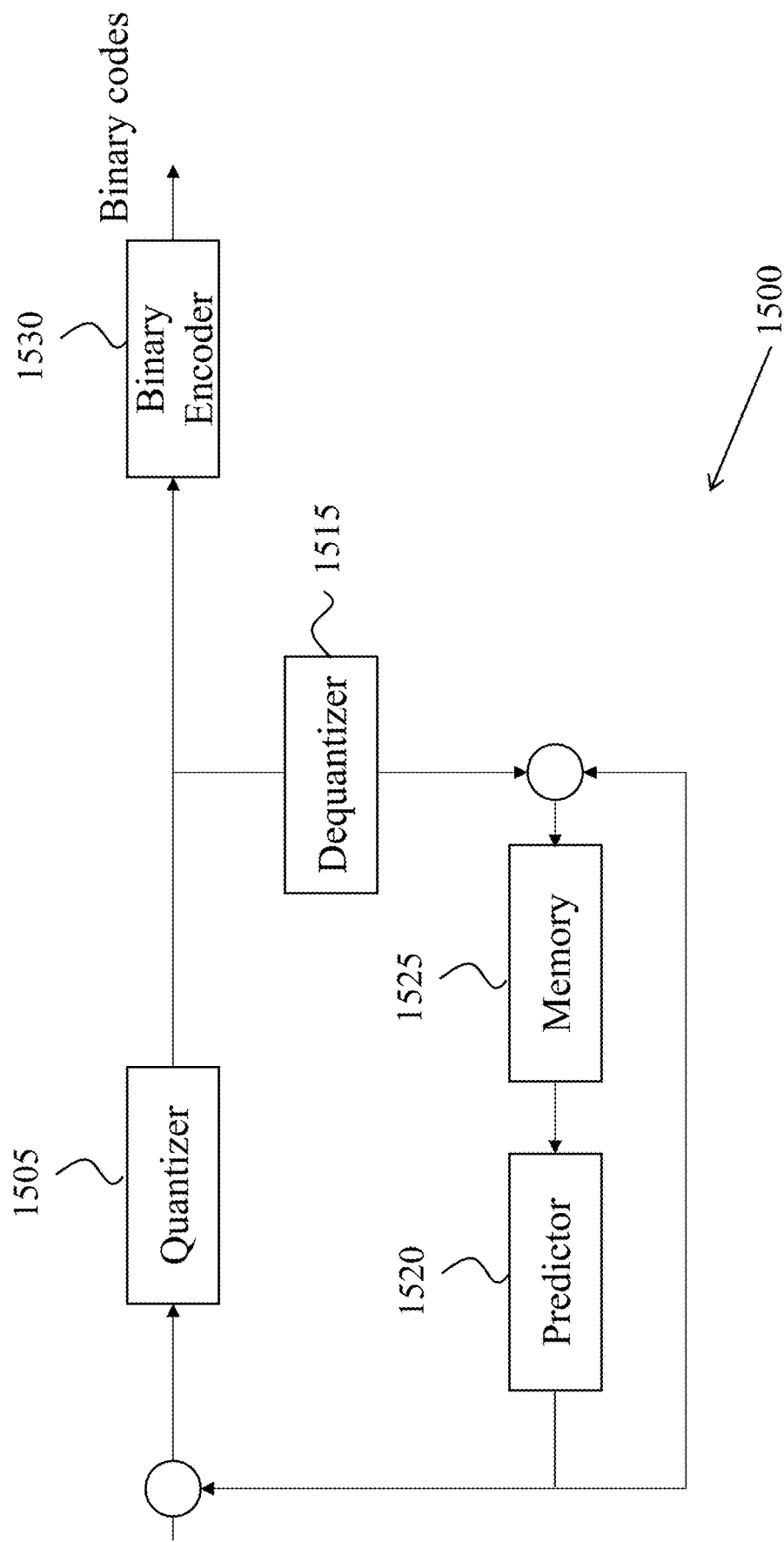
FIG. 15 is a block diagram illustrating an example encoding apparatus that can be utilized to implement various portions of the presently disclosed technology.

FIG. 15 is a block diagram illustrating an example encoding apparatus 1500 that can be utilized to implement various portions of the presently disclosed technology, including (but not limited to) method 1300 and method 1400. The encoding apparatus 1500 includes a quantizer 1505 for compressing input data bits. The encoding apparatus 1500 also includes a dequantizer 1515 so that data bits can be fed into memory 1525 and predictor 1520 to perform motion estimation. The encoding apparatus 1500 further includes a binary encoder 1530 to generated encoded binary codes.

Figure 16:
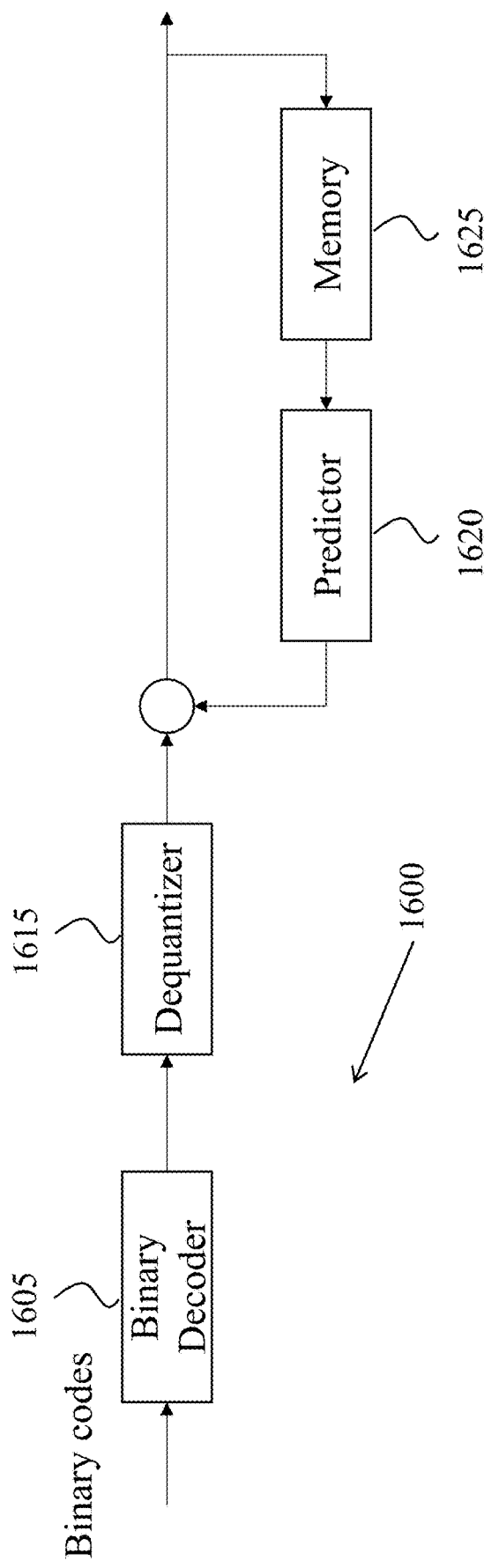
FIG. 16 is a block diagram illustrating an example encoding apparatus that can be utilized to implement various portions of the presently disclosed technology.

FIG. 16 is a block diagram illustrating an example encoding apparatus 1600 that can be utilized to implement various portions of the presently disclosed technology, including (but not limited to) method 1300 and method 1400. The decoding apparatus 1600 includes a bindery decoder 1605 to decode the binary codes. The decoding apparatus 1600 also includes a dequantizer 1615 so that decoded data bits can be fed into memory 1625 and predictor 1620 to perform motion estimation on the decoding side.

Figure 17:
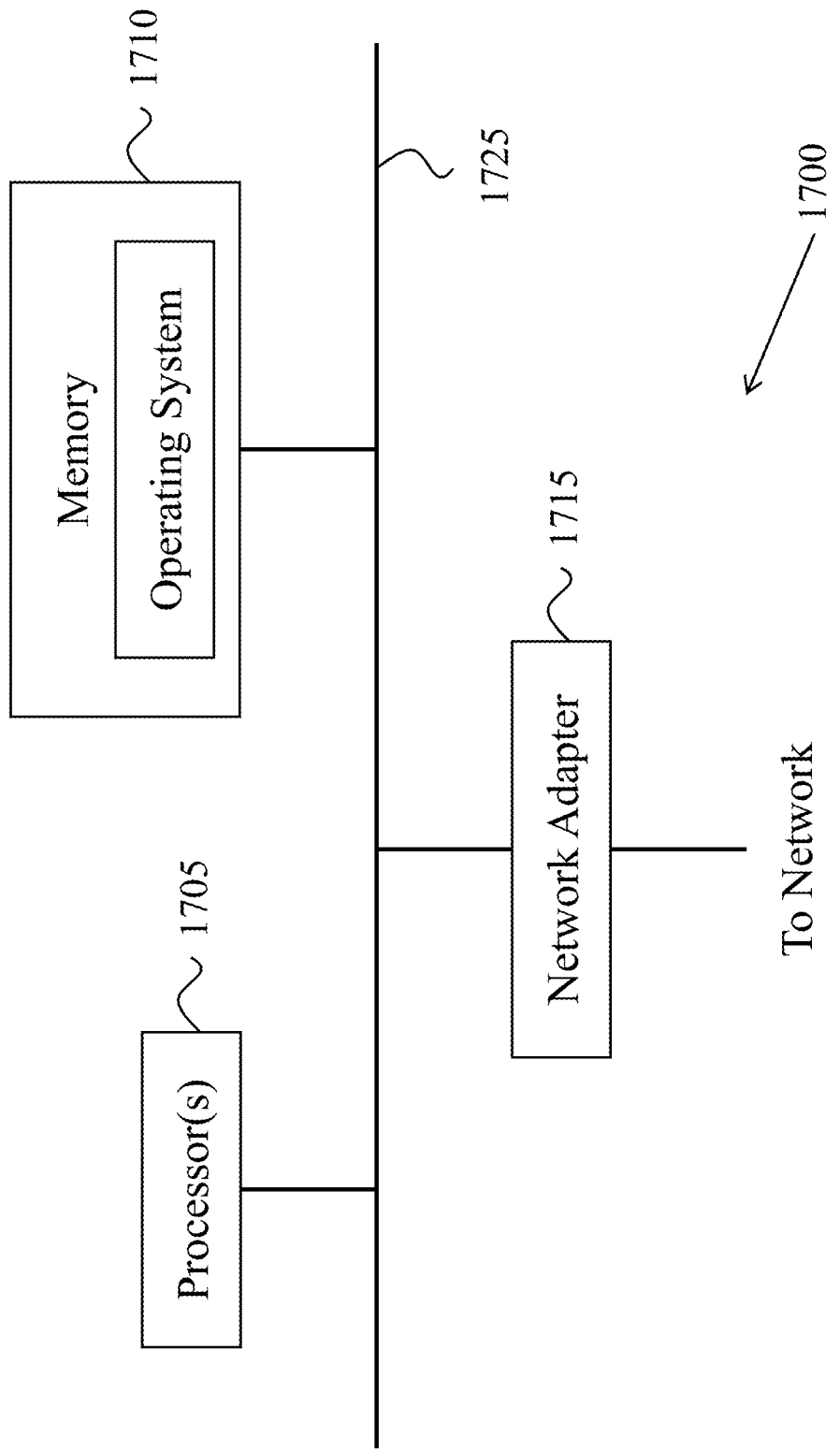
FIG. 17 is a block diagram illustrating an example of the architecture for a computer system or other control device that can be utilized to implement various portions of the presently disclosed technology.

FIG. 17 is a block diagram illustrating an example of the architecture for a computer system or other control device 1700 that can be utilized to implement various portions of the presently disclosed technology, including (but not limited to) method 1300 and method 1400. In FIG. 17, the computer system 1700 includes one or more processors 1705 and memory 1710 connected via an interconnect 1725. The interconnect 1725 may represent any one or more separate physical buses, point to point connections, or both, connected by appropriate bridges, adapters, or controllers. The interconnect 1725, therefore, may include, for example, a system bus, a Peripheral Component Interconnect (PCI) bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 674 bus, sometimes referred to as "Firewire."

The processor(s) 1705 may include central processing units (CPUs) to control the overall operation of, for example, the host computer. In certain embodiments, the processor(s) 1705 accomplish this by executing software or firmware stored in memory 1710. The processor(s) 1705 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

The memory 1710 can be or include the main memory of the computer system. The memory 1710 represents any suitable form of random access memory (RAM), read-only memory (ROM), flash memory, or the like, or a combination of such devices. In use, the memory 1710 may contain, among other things, a set of machine instructions which, when executed by processor 1705, causes the processor 1705 to perform operations to implement embodiments of the presently disclosed technology.

Also connected to the processor(s) 1705 through the interconnect 1725 is a (optional) network adapter 1715. The network adapter 1715 provides the computer system 1700 with the ability to communicate with remote devices, such as the storage clients, and/or other storage servers, and may be, for example, an Ethernet adapter or Fiber Channel adapter.

Figure 18:
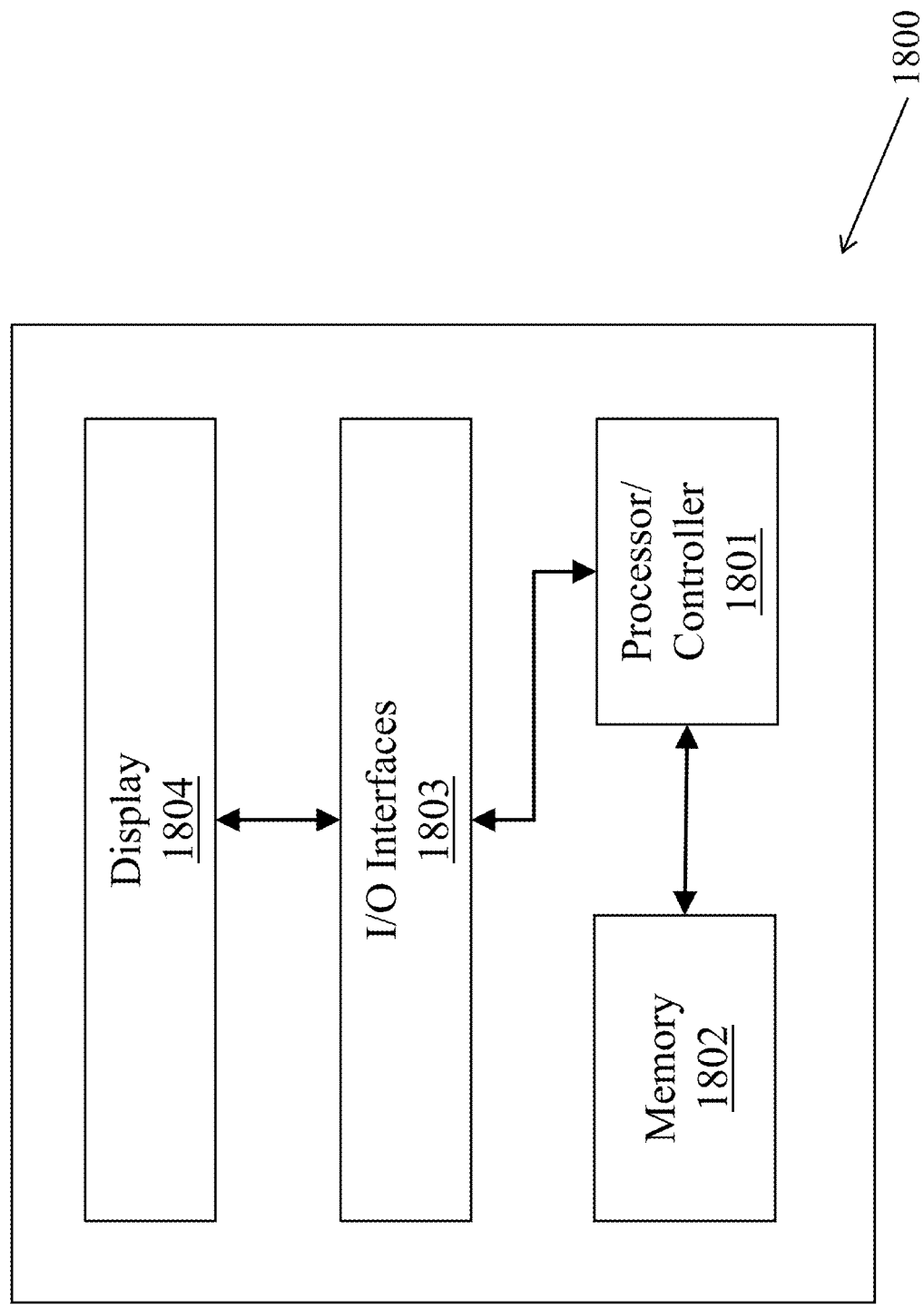
FIG. 18 shows a block diagram of an example embodiment of a mobile device that can be utilized to implement various portions of the presently disclosed technology.

FIG. 18 shows a block diagram of an example embodiment of a mobile device 1800 that can be utilized to implement various portions of the presently disclosed technology, including (but not limited to) method 1600. The mobile device 1800 can be a laptop, a smartphone, a tablet, a camcorder, or other types of devices that are capable of processing videos. The mobile device 1800 includes a processor or controller 1801 to process data, and memory 1802 in communication with the processor 1801 to store and/or buffer data. For example, the processor 1801 can include a central processing unit (CPU) or a microcontroller unit (MCU). In some implementations, the processor 1801 can include a field-programmable gate-array (FPGA). In some implementations, the mobile device 1800 includes or is in communication with a graphics processing unit (GPU), video processing unit (VPU) and/or wireless communications unit for various visual and/or communications data processing functions of the smartphone device. For example, the memory 1802 can include and store processor-executable code, which when executed by the processor 1801, configures the mobile device 1800 to perform various operations, e.g., such as receiving information, commands, and/or data, processing information and data, and transmitting or providing processed information/data to another device, such as an actuator or external display.

To support various functions of the mobile device 1800, the memory 1802 can store information and data, such as instructions, software, values, images, and other data processed or referenced by the processor 1801. For example, various types of Random Access Memory (RAM) devices, Read Only Memory (ROM) devices, Flash Memory devices, and other suitable storage media can be used to implement storage functions of the memory 1802. In some implementations, the mobile device 1800 includes an input/output (I/O) unit 1803 to interface the processor 1801 and/or memory 1802 to other modules, units or devices. For example, the I/O unit 1803 can interface the processor 1801 and memory 1802 with to utilize various types of wireless interfaces compatible with typical data communication standards, e.g., such as between the one or more computers in the cloud and the user device. In some implementations, the mobile device 1800 can interface with other devices using a wired connection via the I/O unit 1803. The mobile device 1800 can also interface with other external interfaces, such as data storage, and/or visual or audio display devices 1804, to retrieve and transfer data and information that can be processed by the processor, stored in the memory, or exhibited on an output unit of a display device 1804 or an external device. For example, the display device 1804 can display a video frame that includes a block (a CU, PU or TU) that applies the intra-block copy based on whether the block is encoded using a motion compensation algorithm, and in accordance with the disclosed technology.

From the foregoing, it will be appreciated that specific embodiments of the presently disclosed technology have been described herein for purposes of illustration, but that various modifications may be made without deviating from the scope of the invention. Accordingly, the presently disclosed technology is not limited except as by the appended claims.

Implementations of the subject matter and the functional operations described in this patent document can be implemented in various systems, digital electronic circuitry, or in computer software, firmware, or hardware, including the structures disclosed in this specification and their structural equivalents, or in combinations of one or more of them. Implementations of the subject matter described in this specification can be implemented as one or more computer program products, i.e., one or more modules of computer program instructions encoded on a tangible and non-transitory computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing unit" or "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of nonvolatile memory, media and memory devices, including by way of example semiconductor memory devices, e.g., EPROM, EEPROM, and flash memory devices. The processor and the memory can be supplemented by, or incorporated in, special purpose logic circuitry.

It is intended that the specification, together with the drawings, be considered exemplary only, where exemplary means an example. As used herein, the singular forms "a", "an" and "the" are intended to include the plural forms as well, unless the context clearly indicates otherwise. Additionally, the use of "or" is intended to include "and/or", unless the context clearly indicates otherwise.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

What is claimed is:

1. A method of processing video data, comprising:
determining, during a conversion between a current video unit of a video which comprises a luma block and at least one chroma block and a bitstream of the video, that motion vectors of control points for the luma block based on an affine mode;
dividing the luma block into luma sub-blocks, wherein each luma sub-block has a second size;
dividing a chroma block of the at least one chroma block into chroma sub-blocks, wherein each chroma sub-block has a first size;
determining a luma motion vector for each luma sub-block based on the motion vectors of the control points;
deriving a chroma motion vector for each chroma sub-block based on luma motion vectors of multiple luma sub-blocks and a color format of the current video unit; and
reconstructing the luma block based on the luma motion vector of each luma sub-block;
wherein the chroma block comprises at least one first chroma group and the first chroma group includes two or four chroma sub-blocks according to the color format of the current video unit, and wherein motion vectors of the chroma sub-blocks included in the first chroma group are same, and
wherein predicted samples of the chroma block are derived using the chroma sub-blocks having the first size equal to the second size in a case that a color format applied for the luma block and the chroma block is 4:2:0 or 4:2:2.

2. The method of claim 1, wherein the motion vectors of the chroma sub-blocks included in the first chroma group are derived based on applying a scaling factor to an intermediate motion vector MV*.

3. The method of claim 2, wherein the first chroma group includes two chroma sub-blocks in a case that the color format is 4:2:2, two luma sub-blocks corresponding to the two chroma sub-blocks has motion vectors $MV_0$ and $MV_1$ respectively, and wherein the intermediate motion vector MV* is derived based on the $MV_0$ and the $MV_1$.

4. The method of claim 3, wherein the intermediate motion vector MV* is derived based on applying an offset-based averaging operation on the $MV_0$ and the $MV_1$.

5. The method of claim 4, wherein the intermediate motion vector MV*=Shift($MV_0$+$MV_1$,1), wherein Shift(x, 1)=(x+offset)>>1, offset is equal to 0 or 1, and wherein >> represents a right shift operation.

6. The method of claim 2, wherein the first chroma group includes four chroma sub-blocks in a case that the color format is 4:2:0, a top-left one of four luma sub-blocks has motion vector $MV_0$, a top-right one of the four luma sub-blocks has motion vector $MV_1$, a bottom-left one of the four luma sub-blocks has motion vector $MV_2$ and a bottom-right one of the four luma sub-blocks has motion vector $MV_3$, and wherein the four luma sub-blocks correspond to the four chroma sub-blocks and the intermediate motion vector MV* is derived at least based on the $MV_0$ and the $MV_3$.

7. The method of claim 6, wherein the intermediate motion vector MV* is derived based on applying an offset-based averaging operation at least on the $MV_0$ and $MV_3$.

8. The method of claim 1, further comprising:
reconstructing the chroma block based on the motion vectors of the chroma sub-blocks included in the first chroma group.

9. The method of claim 8, wherein reconstructing the chroma block in units of the first chroma group.

10. The method of claim 1, wherein the conversion includes encoding the current video unit into the bitstream.

11. The method of claim 1, wherein the conversion includes decoding the current video unit from the bitstream.

12. An apparatus for processing video data comprising a processor and a non-transitory memory with instructions thereon, wherein the instructions upon execution by the processor, cause the processor to:

determine, during a conversion between a current video unit of a video which comprises a luma block and at least one chroma block and a bitstream of the video, that motion vectors of control points for the luma block based on an affine mode;

divide the luma block into luma sub-blocks, wherein each luma sub-block has a second size;

divide a chroma block of the at least one chroma block into chroma sub-blocks, wherein each chroma sub-block has a first size;

determine a luma motion vector for each luma sub-block based on the motion vectors of the control points;

derive a chroma motion vector for each chroma sub-block based on luma motion vectors of multiple luma sub-blocks and a color format of the current video unit; and reconstruct the luma block based on the luma motion vector of each luma sub-block;

wherein the chroma block comprises at least one first chroma group and the first chroma group includes two or four chroma sub-blocks according to the color format of the current video unit, and wherein motion vectors of the chroma sub-blocks included in the first chroma group are same, and wherein predicted samples of the chroma block are derived using the chroma sub-blocks having the first size equal to the second size in a case that a color format applied for the luma block and the chroma block is 4:2:0 or 4:2:2.

13. The apparatus of claim 12, wherein the motion vectors of the chroma sub-blocks included in the first chroma group are derived based on applying a scaling factor to an intermediate motion vector MV*.

14. The apparatus of claim 13, wherein the first chroma group includes two chroma sub-blocks in a case that the color format is 4:2:2, two luma sub-blocks corresponding to the two chroma sub-blocks has motion vectors $MV_0$ and $MV_1$ respectively, and wherein the intermediate motion vector MV* is derived based on the $MV_0$ and the $MV_1$.

15. The apparatus of claim 14, wherein the intermediate motion vector MV* is derived based on applying an offset-based averaging operation on the $MV_0$ and the $MV_1$.

16. The apparatus of claim 15, wherein the intermediate motion vector MV*=Shift($MV_0$+$MV_1$,1), wherein Shift(x,1)=(x+offset)>>1, offset is equal to 0 or 1, and wherein >>represents a right shift operation.

17. The apparatus of claim 12, wherein the instructions upon execution by the processor, further cause the processor to:

reconstruct the chroma block based on the motion vectors of the chroma sub-blocks included in the first chroma group.

18. The apparatus of claim 17, wherein reconstruct the chroma block in units of the first chroma group.

19. A non-transitory computer-readable storage medium storing instructions that cause a processor to:

determine, during a conversion between a current video unit of a video which comprises a luma block and at least one chroma block and a bitstream of the video, that motion vectors of control points for the luma block based on an affine mode;

divide the luma block into luma sub-blocks, wherein each luma sub-block has a second size;

divide a chroma block of the at least one chroma block into chroma sub-blocks, wherein each chroma sub-block has a first size;

determine a luma motion vector for each luma sub-block based on the motion vectors of the control points;

derive a chroma motion vector for each chroma sub-block based on luma motion vectors of multiple luma sub-blocks and a color format of the current video unit; and reconstruct the luma block based on the luma motion vector of each luma sub-block;

wherein the chroma block comprises at least one first chroma group and the first chroma group includes two or four chroma sub-blocks according to the color format of the current video unit, and wherein motion vectors of the chroma sub-blocks included in the first chroma group are same, and wherein predicted samples of the chroma block are derived using the chroma sub-blocks having the first size equal to the second size in a case that a color format applied for the luma block and the chroma block is 4:2:0 or 4:2:2.

20. A non-transitory computer-readable recording medium storing a bitstream of a video which is generated by a method performed by a video processing apparatus, wherein the method comprises:

determining, during a conversion between a current video unit of the video which comprises a luma block and at least one chroma block and a bitstream of the video, that motion vectors of control points for the luma block based on an affine mode;

dividing the luma block into luma sub-blocks, wherein each luma sub-block has a second size;

dividing a chroma block of the at least one chroma block into chroma sub-blocks, wherein each chroma sub-block has a first size;

determining a luma motion vector for each luma sub-block based on the motion vectors of the control points;

deriving a chroma motion vector for each chroma sub-block based on luma motion vectors of multiple luma sub-blocks and a color format of the current video unit; and generating the bitstream based on above determining and dividing, wherein the conversion include reconstructing the luma block based on the luma motion vector of each luma sub-block;

wherein the chroma block comprises at least one first chroma group and the first chroma group includes two or four chroma sub-blocks according to the color format of the current video unit, and wherein motion vectors of the chroma sub-blocks included in the first chroma group are same, and wherein predicted samples of the chroma block are derived using the chroma sub-blocks having the first size equal to the second size in a case that a color format applied for the luma block and the chroma block is 4:2:0 or 4:2:2.

\* \* \* \* \*